US012429793B2

(12) United States Patent
Nishimura et al.

(10) Patent No.: US 12,429,793 B2
(45) Date of Patent: Sep. 30, 2025

(54) MAGNETIC CARRIER AND TWO-COMPONENT DEVELOPER

(71) Applicant: CANON KABUSHIKI KAISHA, Tokyo (JP)

(72) Inventors: Yuu Nishimura, Chiba (JP); Yuzo Tokunaga, Chiba (JP); Nobuyoshi Sugahara, Tokyo (JP); Hironori Minagawa, Ibaraki (JP); Nobuhiro Yoshida, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 908 days.

(21) Appl. No.: 17/666,326

(22) Filed: Feb. 7, 2022

(65) Prior Publication Data

US 2022/0269189 A1 Aug. 25, 2022

(30) Foreign Application Priority Data

Feb. 12, 2021 (JP) ................................ 2021-020450
Dec. 23, 2021 (JP) ................................ 2021-208923

(51) Int. Cl.
*G03G 9/113* (2006.01)

(52) U.S. Cl.
CPC ......... *G03G 9/1133* (2013.01); *G03G 9/1131* (2013.01)

(58) Field of Classification Search
CPC ............................ G03G 9/1133; G03G 9/1134
See application file for complete search history.

(56) References Cited

U.S. PATENT DOCUMENTS

2017/0255120 A1* 9/2017 Hasegawa ............ G03G 9/1132

FOREIGN PATENT DOCUMENTS

| | | | | | |
|---|---|---|---|---|---|
| EP | 2990874 | B1 | * | 10/2017 | ............ G03G 9/083 |
| JP | S5397435 | A | | 8/1978 | |
| JP | 62273576 | A | * | 11/1987 | ............ G03G 9/091 |
| JP | S63235963 | A | | 9/1988 | |
| JP | H02186360 | A | | 7/1990 | |

OTHER PUBLICATIONS

Translation of JP-62273576-A published Nov. 27, 1987.*

* cited by examiner

*Primary Examiner* — Peter L Vajda
(74) *Attorney, Agent, or Firm* — Canon U.S.A., Inc. IP Division

(57) ABSTRACT

A magnetic carrier comprises a magnetic carrier core and a coating resin layer coating a surface of the magnetic carrier core. The coating resin layer contains resin A and resin B at contents of 1% to 50% by mass and 50% to 90% by mass, respectively, based on resin components of the coating resin layer. The resin A has a first partial structure and a second partial structure, while the resin B has a third partial structure and a fourth partial structure. The mass X of the resin A, the total mass Ma of the first partial structure, and the total mass Mb of the second partial structure satisfy $0.50 \leq (Ma+Mb)/X \leq 1.00$ and $0.10 \leq a/b \leq 30.0$, and the SP value of the first partial structure SPa1 and the SP value of the third partial structure SPb3 satisfy $0 \leq |SPa1-SPb3| \leq 10.0$.

7 Claims, 3 Drawing Sheets

MAGNETIC CARRIER AND TWO-COMPONENT DEVELOPER

BACKGROUND OF THE INVENTION

Field of the Invention

The present disclosure relates to a magnetic carrier and a two-component developer used in an image forming method for visualizing an electrostatic charge image using an electrophotographic method.

Description of the Related Art

Conventional electrophotographic image forming methods generally use various means to form an electrostatic latent image on an electrostatic latent image bearing member, and then attach toner to this electrostatic latent image to develop the electrostatic latent image. In this development, the two-component development method is widely used in which support particles called magnetic carriers are mixed with the toner and frictionally charged to impart an appropriate amount of positive or negative charge to the toner, which is then developed using the charge as a driving force.

The two-component development method has the advantage that the magnetic carrier can be given the functions of agitating, transporting, and charging the developer, so that the division of functions between it and the toner is clear, and this allows for better control of developer performance. Here, a magnetic carrier is often configured such that it has a core for imparting magnetism to acquire transportability, and the core is coated with a coating resin for acquiring the ability to impart charge to the toner. In recent years, due to technological evolution in the field of electrophotography, the longevity of the main body is required at higher levels, and the carrier is required to maintain charge imparting ability even in long-term use. It is generally known that the carrier has a reduced charge imparting ability due to a decrease in charging sites attributed to adhesion of a toner component, which causes image harmful effects such as a change in color tone.

As a means for acquiring the durability characteristics against adhesion of the toner component described above (hereinafter referred to as contamination resistance), there is an example in which a fluororesin or the like, which is a material having a low surface free energy, is used as the coating resin (Japanese Patent Application Laid-Open No. S63-235963).

However, in general, a material having a low surface free energy such as a fluororesin can suppress the adhesion of toner components and the like, but has a property that due to weak interaction between molecules, it is easily destroyed by an external force or the like. Therefore, if a fluororesin is used for the coating layer of the carrier, the coating layer may be worn due to a mechanical load or the like generated during agitation or transportation in the developing machine. Then, as a result of the decrease in the surface resistance of the carrier, the charge imparting ability of the carrier may decrease. In addition, low-surface free energy materials such as fluororesin have poor adhesion to the carrier core material (hereinafter also referred to as carrier core), and film releasing may occur at the interface between the core material and the coating layer due to external force.

In order to reduce the wear and film releasing of the coating layer described above, one can consider an example of graft-copolymerizing multiple kinds of fluororesin, for example, fluorinated alkyl (meth)acrylates, but this structure is insufficient in the wear resistance of the coating layer and the adhesion to the core material (Japanese Patent Application Laid-Open No. S53-97435). Further, in order to improve the wear resistance, one can consider use in combination with another (meth)acrylate-based copolymer (hereinafter also referred to as a blend)(Japanese Patent Application Laid-Open No. H02-186360). However, in order to improve the contamination resistance, it is necessary to take measures such as containing a fluorinated alkyl (meth)acrylate at 50% by mass or more, which is considered not to improve the wear resistance so much.

In the above example, the reason why it is necessary to contain a fluorinated alkyl (meth)acrylate at 50% by mass or more is due to the following. When the fluorinated alkyl (meth)acrylate is blended with another acrylate-based copolymer, the interaction of the acrylic portions is strong, the acrylic portions are attracted to each other, and the fluorinated alkyl group portions are easily aggregated exclusively. It is considered that the exclusively aggregated fluorinated alkyl group portions cannot contribute to low surface free energy (contamination resistance). Therefore, it is considered that in order to ensure sufficient contamination resistance, the blend has a high ratio of fluorinated alkyl (meth) acrylates, rendering the wear resistance insufficient.

That is, in order to obtain a carrier with high stability and long life, it is required to achieve both contamination resistance that suppresses adhesion of toner components and wear resistance that suppresses wear of the coat due to mechanical load or the like at a higher level.

SUMMARY OF THE INVENTION

From the above, it is an aspect of the present disclosure to provide a carrier that achieves reduced fogging, reduced toner splattering, stable image density, and developability even after long-term use.

As a result of diligent studies, the present inventors have found that by using resin A and resin B shown in the following structures, it is possible to achieve both contamination resistance and wear resistance of a carrier. The resin A has a halogen-substituted alkyl group, and this structure has a structure grafted to the main chain, which causes a decrease in surface free energy derived from the halogen-substituted alkyl group and improves contamination resistance. Further, the resin B has a hydrocarbon group containing an alicyclic structure and has a structure having high compatibility with the main chain of the resin A, and therefore, the resin A and the resin B are mixed, and the hydrocarbon group containing the alicyclic structure suppresses the aggregation of the above-mentioned halogen-substituted alkyl group portions. Therefore, the halogen-substituted alkyl group that contributes to low surface free energy can be effectively utilized, which improves the contamination resistance.

As mentioned above, when a fluorinated alkyl (meth) acrylate is simply blended with another acrylate-based copolymer, the fluorinated alkyl group portions aggregate with each other and cannot efficiently contribute to contamination resistance, and thus it is necessary to increase the ratio of the fluorinated alkyl (meth)acrylate. As a result, the wear resistance of the carrier is insufficient.

However, by blending with the resin B, which has a structure having a hydrocarbon group containing an alicyclic structure and has a structure that interacts with the main chain of resin A, the hydrocarbon group containing the alicyclic structure becomes a steric hindrance and exclusively inhibits the aggregation of the halogen-substituted alkyl group portions. This makes it possible to achieve both contamination resistance and wear resistance at a high level.

Specifically, a carrier of the present disclosure is a magnetic carrier comprising: a magnetic carrier core; and a coating resin layer coating a surface of the magnetic carrier core, wherein the coating resin layer contains resin A and resin B, and a content of the resin A is 1% by mass or more and 50% by mass or less based on mass of resin components contained in the coating resin layer, while a content of the resin B is 50% by mass or more and 99% by mass or less based on mass of resin components contained in the coating resin layer. The resin A has a first partial structure represented by a formula (1) and a second partial structure represented by a formula (2), while the resin B has a third partial structure represented by a formula (3) and a fourth partial structure represented by a formula (4).

Formula (1)

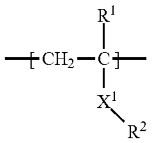

In the formula (1). $R^1$ represents a hydrogen or methyl group. $X^1$ represents —COO— or —O—. $R^2$ represents an alkyl group having 1 to 20 carbon atoms, the alkyl group is a halogen-substituted alkyl group in which at least a part of hydrogen atoms is substituted with a fluorine atom, and a part of remaining hydrogen atoms may be substituted with a halogen atom other than a fluorine atom, and based on a total number of hydrogen atoms, fluorine atoms, and halogen atoms other than fluorine atoms contained in the halogen-substituted alkyl group, a proportion of the fluorine atoms is 5.0 atom % or more, and a proportion of the halogen atoms other than fluorine atoms is 40.0 atom % or less.

Formula (2)

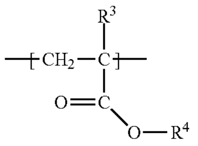

In the formula (2), $R^3$ represents a hydrogen or methyl group. $R^4$ represents a hydrocarbon group having 1 to 12 carbon atoms.

Formula (3)

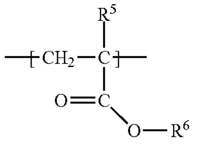

In the formula (3), $R^5$ represents a hydrogen or methyl group. $R^6$ represents a hydrocarbon group having 3 to 10 carbon atoms containing an alicyclic structure.

Formula (4)

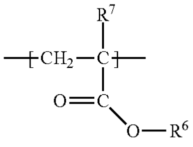

In the formula (4), $R^7$ represents a hydrogen or methyl group, and $R^8$ represents a chain hydrocarbon group having 1 to 12 carbon atoms.

When a mass of the resin A is represented by X, a total mass of the first partial structure in the resin A is represented by Ma, and a total mass of the second partial structure in the resin A is represented by Mb, X, Ma and Mb satisfy $0.50 \leq (Ma+Mb)/X \leq 1.00$ and $0.10 \leq Ma/Mb \leq 30.0$. When an SP value of the first partial structure is represented by SPa1, and an SP value of the third partial structure is represented by SPb3, SPa1 and SPb3 satisfy $0 \leq |SPa1-SPb3| \leq 10.0$.

Further, a developer of the present disclosure is a two-component developer comprising: the magnetic carrier and toner having the above-mentioned constitution.

Further features of the present disclosure will become apparent from the following description of exemplary embodiments with reference to the attached drawings.

DESCRIPTION OF THE EMBODIMENTS

Figure 1:
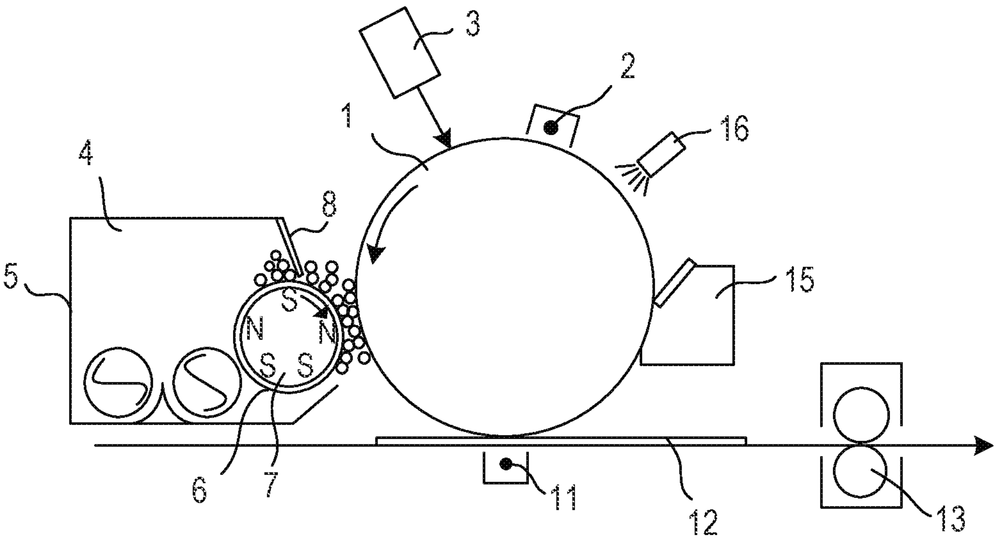
FIG. 1 is a schematic diagram of an image forming apparatus suitable for image formation using the present disclosure.

In the present disclosure, the description of "AA or more and BB or less" and "AA to BB" indicating a numerical range means a numerical range including a lower limit and an upper limit which are end points, unless otherwise specified.

A carrier of the present disclosure is a magnetic carrier comprising: a magnetic carrier core; and a coating resin layer coating a surface of the magnetic carrier core, wherein the coating resin layer contains resin A and resin B. and a content of the resin A is 1% by mass or more and 50% by mass or less based on mass of resin components contained in the coating resin layer, while a content of the resin B is 50% by mass or more and 99% by mass or less based on mass of resin components contained in the coating resin layer. The resin A has a first partial structure represented by a formula (1) and a second partial structure represented by a formula (2), while the resin B has a third partial structure represented by a formula (3) and a fourth partial structure represented by a formula (4), Formula (1)

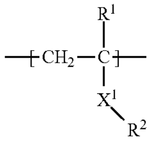

In the formula (1). $R^1$ represents a hydrogen or methyl group. $X^1$ represents —COO— or —O—. $R^2$ represents an alkyl group having 1 to 20 carbon atoms, the alkyl group is a halogen-substituted alkyl group in which at least a part of hydrogen atoms is substituted with a fluorine atom, and a part of remaining hydrogen atoms may be substituted with a halogen atom other than a fluorine atom, and based on a total number of hydrogen atoms, fluorine atoms, and halogen atoms other than fluorine atoms contained in the halogen-substituted alkyl group, a proportion of the fluorine atoms is 5.0 atom % or more, and a proportion of the halogen atoms other than fluorine atoms is 40.0 atom % or less.

Formula (2)

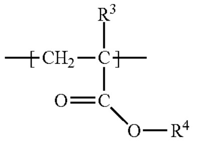

$R^3$ represents a hydrogen or methyl group. $R^4$ represents a hydrocarbon group having 1 to 12 carbon atoms.

Formula (3)

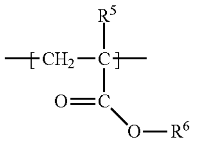

$R^5$ represents a hydrogen or methyl group. $R^6$ represents a hydrocarbon group having 3 to 10 carbon atoms containing an alicyclic structure.

Formula (4)

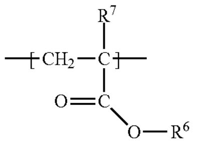

$R^7$ represents a hydrogen or methyl group, and $R^8$ represents a chain hydrocarbon group having 1 to 12 carbon atoms.

When a mass of the resin A is represented by X, a total mass of the first partial structure in the resin A is represented by Ma, and a total mass of the second partial structure in the resin A is represented by Mb, X, Ma and Mb satisfy $0.50 \le (Ma+Mb)/X \le 1.00$ and $10 \le Ma/Mb \le 30.0$. When an SP value of the first partial structure is represented by SPa1, and an SP value of the third partial structure is represented by SPb3, SPa1 and SPb3 satisfy $0 \le |SPa1-SPb3| \le 10.0$.

<Carrier Coating Resin>

As described above, when only a fluororesin having a low surface free energy such as a fluorinated alkyl (meth) acrylate is used as a coating resin, the wear resistance deteriorates. In addition, when simply blended with an acrylic resin, contamination resistance and wear resistance cannot be achieved at a high level.

In view of this, the carrier of the present disclosure has a resin A and a resin B, and the resin A has a halogen-substituted alkyl group structure, and this structure is grafted to the main chain, so that the surface free energy derived from the halogen-substituted alkyl group structure is lowered, improving the contamination resistance.

Further, since the resin B contains an alicyclic hydrocarbon, the alicyclic hydrocarbon suppresses aggregation of the above-mentioned halogen-substituted alkyl group portions, improving the contamination resistance. Further, it has a structure having high compatibility with the main chain of the resin A, so that the resin A and the resin B are less likely to be released due to a mechanical load such as a shear generated by the developing machine, improving the wear resistance.

The resin A has a first partial structure represented by the above formula (1) and a second partial structure represented by the above formula (2). The first partial structure has a halogen-substituted alkyl group, and this structure lowers the surface free energy, thus improving the contamination resistance. The second partial structure has an ester structure and has good compatibility with the resin B.

In the first partial structure, $R^1$ represents a hydrogen or methyl group, and $X^1$ represents —COO— or —O—. $R^2$ represents an alkyl group having 1 to 20 carbon atoms, and this alkyl group is a halogen-substituted alkyl group in which at least a part of hydrogen atoms is substituted with a fluorine atom, and a part of remaining hydrogen atoms may be substituted with a halogen atom other than a fluorine atom. In addition, based on a total number of hydrogen atoms, fluorine atoms, and halogen atoms other than fluorine atoms contained in the halogen-substituted alkyl group, a proportion of the fluorine atoms is 5.0 atom % or more, and a proportion of the halogen atoms other than fluorine atoms is 40.0 atom % or less. As a specific method of introducing the first partial structure, for example, when polymerizing the resin A, one may copolymerize an acrylic acid ester or a methacrylic acid ester having an esterified halogen-substituted alkyl structure.

In the second partial structure. $R^3$ represents a hydrogen or methyl group, and $R^4$ represents a hydrocarbon group having 1 to 12 carbon atoms. As a specific method of introducing the second partial structure, for example, one may copolymerize the following monomers in the polymerization of the resin A. Methyl acrylate, ethyl acrylate, propyl acrylate, butyl acrylate, hexyl acrylate, cyclobutyl acrylate, cyclohexyl acrylate, cyclopentyl acrylate, cyclooctyl acrylate, methyl methacrylate, ethyl methacrylate, propyl methacrylate, butyl methacrylate, hexyl methacrylate, cyclobutyl methacrylate, cyclohexyl methacrylate, cyclopentyl methacrylate, cyclooctyl methacrylate.

As for the resin A, when the mass of the resin A, the mass of the first partial structure, and the mass of the second partial structure are X, Ma, and Mb, respectively, X, Ma, and Mb satisfy $$0.50 \le (Ma+Mb)/X \le 1.00$$

$$0.10 \le Ma/Mb \le 30.0.$$

This relational expression indicates that the first partial structure and the second partial structure amount to 50% by mass or more of the total structure constituting the resin A, and that the first partial structure is the same mass % as compared with the second partial structure, multiplied by a numerical value in the range of 0.10 to 30.0. The term (Ma+Mb)/X is preferably 0.50 or more in order to improve the contamination resistance, and when it is less than 0.50, the compatibility with the resin B is lowered. Further, when Ma/Mb is greater than 30.0, the proportion of the first partial structure becomes too high, and the wear resistance is lowered. To the contrary, when Ma/Mb is less than 0.10, the surface free energy becomes too high and the contamination resistance is lowered.

The proportion of the resin A contained in the coating resin is 1% by mass or more and 50% by mass or less based on the resin components constituting the coating resin layer. When it is less than 1% by mass, the surface free energy does not decrease, so that the contamination resistance becomes insufficient. When it is greater than 50% by mass, the decrease in the intermolecular force due to the low surface free energy becomes large, so that the wear resistance becomes insufficient. A more preferable range is 3% by mass or more and 20 parts by mass or less.

The resin B has a third partial structure represented by the above formula (3) and a fourth partial structure represented by the above formula (4). The third partial structure has a hydrocarbon group containing an alicyclic structure, and this structure can suppress the aggregation of the halogen-substituted alkyl group portions contained in the first partial structure, and can improve the contamination resistance without lowering the wear resistance.

Further, when an alicyclic hydrocarbon group is contained, the surface (coating surface) of the resin coating layer that covers the surface of the magnetic carrier core becomes smooth, which suppresses the adhesion of toner-derived components such as toner and an external additive that imparts fluidity to the toner, further improving contamination resistance. The fourth partial structure has an ester structure and has good compatibility with the resin A.

In the third partial structure, $R^5$ represents a hydrogen or methyl group, and $R^6$ represents a hydrocarbon group having 3 to 10 carbon atoms containing an alicyclic structure. Examples of the alicyclic hydrocarbon group include a cyclohexyl group, a cycloheptyl group, a cyclooctyl group, a cyclopentyl group, a cyclobutyl group, a cyclopropyl group, and the like. As a specific method of introducing the third partial structure, for example, when polymerizing the resin B, one may copolymerize cyclobutyl methacrylate, cyclohexyl methacrylate, cyclopentyl methacrylate, cyclooctyl methacrylate, or the like.

In the fourth partial structure, $R^7$ represents a hydrogen or methyl group, and $R^8$ represents a chain hydrocarbon group having 1 to 12 carbon atoms. The fourth partial structure is preferably the same as the second partial structure of the resin A. As a specific method of introducing the fourth partial structure, for example, one may copolymerize the following monomers in the polymerization of the resin B. Methyl acrylate, ethyl acrylate, propyl acrylate, butyl acrylate, hexyl acrylate, methyl methacrylate, ethyl methacrylate, propyl methacrylate, butyl methacrylate, hexyl methactylate.

The proportion of the resin B contained in the coating resin is 50% by mass or more and 99% by mass or less based on the resin components constituting the coating resin layer. When it is less than 50% by mass, the resin strength becomes insufficient and the wear resistance deteriorates. When it is greater than 99% by mass, the effect of the components having low surface free energy becomes insufficient, and thus the contamination resistance deteriorates.

When the SP value of the first partial structure of the resin A and the SP value of the third partial structure of the resin B are Spa1 and SPb3, respectively, Spa1 and SPb3 satisfy the following formula: $0 \leq |SPa1-SPb3| \leq 10.0$.

The SP value is calculated by the following method.

$$SP\ \text{value}=\sqrt{(Ev/v)}=\sqrt{(\Sigma\Delta ei/\Sigma\Delta vi)} \quad \text{Formula:}$$

(In the formula. Ev: energy of evaporation (J/mol), v: molar volume ($cm^3$/mol), Δei: energy of evaporation of each atom or atomic group, and Δvi: molar volume of each atom or atomic group)

When this relational expression is satisfied, due to the compatibility with the first partial structure of the resin A and the third partial structure of the resin B, the hydrocarbon group containing the alicyclic structure of the third partial structure effectively acts as a steric hindrance to the exclusive aggregation of the halogen-substituted alkyl group portions of the first partial structure. As a result, since the halogen-substituted alkyl group portions of the first partial structure function efficiently, even a small amount thereof can improve the contamination resistance and suppress the deterioration of the wear resistance.

Further, it is preferable that the first partial structure of the resin A has a structure represented by the following formula (1-3) in order to achieve both contamination resistance and wear resistance.

Formula (1-3)

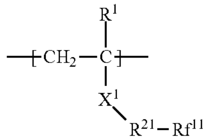

In the above formula (1-3), $R^1$ represents a hydrogen or methyl group, and $X^1$ represents —COO— or —O—. $R^{21}$ represents a single bond or an alkylene group, and $Rf^{11}$ represents a fluoroalkyl group.

In the formula (1-3), it is preferable that $R^{21}$ is an alkylene group having no branched structure, and $Rf^{11}$ is a fluoroalkyl group having no branched chain. In addition, the following structures can be exemplified as the structures included in the formula (1-3).

Formula (1-1)

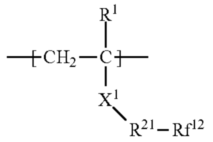

Formula (1-2)

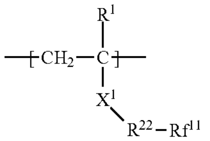

In the formula (1-1) or (1-2). $R^1$ represents a hydrogen or methyl group, and $X^1$ represents —COO— or —O—. $R^{21}$ represents a single bond or an alkylene group having no branched structure, $R^{22}$ represents an alkylene group having a branched structure due to a carbon-carbon bond, and $Rf^{11}$ represents a fluoroalkyl group. $Rf^2$ represents a fluoroalkyl group having a tertiary carbon or quaternary carbon.

Specific examples of the structure of the unit represented by the formula (1-3) are shown.

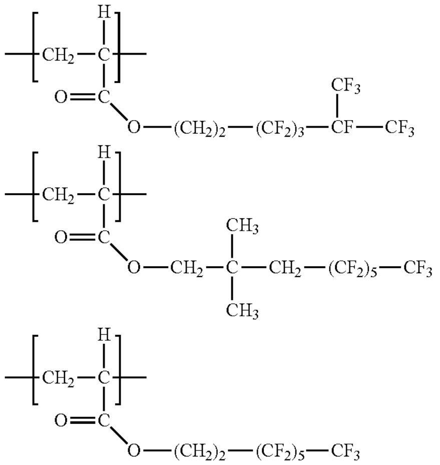

Further, when an average value of a total number of the first partial structure and the second partial structure in molecular chains constituting the resin A is represented by m, it is preferable that the resin A satisfies the following formula.

$$50 \leq m \leq 250$$

When m is 50 or more, the molecular weight becomes sufficiently high, so that the wear resistance is further improved, and when it is 250 or less, the interaction between the resin A and the resin B is further enhanced, so that the wear resistance and the contamination resistance are further improved.

Further, the resin A may have a functional group such as a nitrogen-containing group, a carboxyl group, or a hydroxyl group. Having these makes it possible to suppress the charge-up of the developer, especially in a low humidity environment. Further, having a hydroxyl value is preferable because it also exhibits the effect of hydrogen bonding, further improving the wear resistance.

The preferable range of the acid value of the resin A w % ben it has a carboxyl group is 5 mgKOH/g or more and 100 mgKOH/g or less. When it is 5 mgKOH/g or more, the charge-up is improved, and when it is 100 mgKOH/g or less, the charge retention of the developer is improved.

The preferable range of the hydroxyl value of the resin A when it has a hydroxyl group is 5 mgKOH/g or more and 50 mgKOH/g or less. When it is 5 mgKOH/g or more, the charge-up is improved, and when it is 50 mgKOH/g or less, the charge retention of the developer is improved.

At the time of synthesizing the resin B, when the total monomer used for the synthesis of the resin B is 100% by mass, it is preferable to use the third partial structure represented by the formula (3) in the range of 5.0% by mass or more and 80% by mass or less for wear resistance and adhesion to the magnetic carrier core.

Further, it is preferable that the resin B has a macromonomer unit represented by the following formula (5) as a partial structure.

Formula (5)

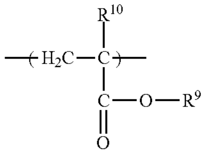

In the formula (5). $R^9$ represents a group composed of a polymer of one or more monomers selected from the group consisting of methyl acrylate, methyl methacrylate, butyl acrylate, butyl methacrylate, 2-ethylhexyl acrylate, 2-ethylhexyl methacrylate, styrene, and acrylonitrile, and $R^{10}$ represents a hydrogen or methyl group. The macromonomer represented by the formula (5) improves adhesion to the carrier core and improves the charge imparting ability of the magnetic carrier to the toner.

The weight average molecular weight (Mw) of the macromonomer is preferably 2000 or more and 10000 or less, and more preferably 3000 or more and 8000 or less. Further, at the time of synthesizing the resin B, when the total monomer used for the synthesis of the resin B is 100% by mass, it is preferable to use the macromonomer in the range of 5.0% by mass or more and 40.0% by mass or less.

The weight average molecular weight (Mw) of the resin B is preferably 20,000 or more and 120.000 or less, and more preferably 30,000 or more and 100,000 or less, from the viewpoint of coating stability.

The acid value of the resin B is preferably 0 mgKOH/g or more and 3.0 mgKOH/g or less, more preferably 0 mgKOH/g or more and 2.8 mgKOH/g or less, and particularly preferably 0 mgKOH/g or more and 2.5 mgKOH/g or less. When the acid value of the resin B is 3.0 mgKOH/g or less, self-aggregation of the resin due to the influence of the acid value is less likely to occur, and the smoothness of the surface (coating surface) of the resin coating layer is less likely to be lowered. The acid value of the resin B can be controlled by using a monomer having a polar group such as a carboxy group or a sulfo group (sulfonic acid group) at the time of synthesizing the resin B, and adjusting the amount of the monomer added. Note that since the acid value is preferably low, it is preferable not to use a monomer having a polar group. Even when the resin is synthesized using only a monomer that forms ester bonds, a slight acid value may be generated in the synthesized resin. It is considered that this is because a part of the ester bonds is decomposed to generate a carboxyl group during the synthesis (polymerization) of the resin.

The average thickness of the coating resin layer containing the resin A and the resin B is preferably 50 nm or more and 3000 nm or less from the viewpoint of durability and resistance.

Further, the coating resin layer of the present disclosure preferably contains conductive fine particles in the coating resin. The conductive fine particles can appropriately control the specific resistance of electrophotographic carriers. As a result, it is possible to release the counter charge after the toner is developed, suppressing white spots. The content of the conductive fine particles added to the coating resin is preferably 0.1 parts by mass or more and 20 parts by mass or less based on 100 parts by mass of the coating resin. When it is less than 0.1 parts by mass, it is difficult to obtain the effect of adding the conductive fine particles, and when it exceeds 20 parts by mass, there is a concern that the color tone may be lowered due to the desorption of the conductive fine particles. Examples of the conductive fine particles include carbon black, titanium oxide, silver, and the like.

Further, the coating resin may contain fine particles for the purpose of enhancing the ability to impart charge to the toner and improving the releasability. The fine particles contained in the coating resin layer may be any fine particles of an organic material or an inorganic material, but are preferably crosslinked resin fine particles or inorganic fine particles having a strength capable of retaining the shape of the fine particles when coated. Examples of the crosslinked resin for forming the crosslinked resin fine particles include cross-linked polymethylmethacrylate resin, crosslinked polystyrene resin, melamine resin, guanamine resin, urea resin, phenolic resin, and nylon resin. Examples of the inorganic fine particles include silica, alumina, and titania.

The content of the fine particles in the coating resin layer is preferably 0.1 parts by mass or more and 20 parts by mass or less based on 100 parts by mass of the coating resin.

The method of producing a copolymer of the resin A and resin B of the present disclosure is produced by a known polymerization method. Specific examples thereof include a bulk polymerization method, a solution polymerization method, and a suspension polymerization method.

<Carrier Core and Production Method Thereof>

As the magnetic carrier core of the present disclosure, known magnetic particles such as magnetite particles, ferrite particles, and magnetic material-dispersed resin particles can be used. Among these, magnetic particles obtained by filling the pores of porous-shaped magnetic particles with resin, or magnetic material-dispersed resin particles, that is, magnetic particles containing magnetic oxides and resin compositions, are preferable from the viewpoint of lifetime extension because they can reduce the specific gravity of magnetic carriers.

Lowering the specific gravity of the magnetic carriers, for example, reduces the load on the toner in the developer state in the developing device, prevents the toner components from sticking to the surface of the magnetic carriers, and reduces the load between carriers, leading to further suppression of releasing, chipping, and scraping of the resin coating layer. In addition, the dot reproducibility can be improved, and a high-definition image can be obtained.

Note that as the resin contained in the pores of the porous-shaped magnetic particles, a copolymer resin used as a coating resin can be used, but it is not limited to this, and a known resin can be used.

As the thermoplastic resin, a copolymer used as a coating resin is preferable, but other examples thereof include the following. Polystyrene, polymethylmethacrylate, styrene-acrylic acid ester copolymer, styrene-methacrylic acid ester copolymer, styrene-butadiene copolymer, ethylene-vinyl acetate copolymer, polyvinyl chloride, polyvinyl acetate, polyvinylidene fluoride resin, fluorocarbon resin, perfluorocarbon resin, solvent-soluble perfluorocarbon resin, polyvinylpyrrolidone, petroleum resin, novolak resin, saturated alkyl polyester resin, polyethylene terephthalate, polybutylene terephthalate, aromatic polyester resins such as polyarylate, polyamide resin, polyacetal resin, polycarbonate resin, polyethersulfone resin, polysulfone resin, polyphenylene sulfide resin, polyether ketone resin.

Examples of thermosetting resins include the following. Phenol resin, modified phenolic resin, maleate resin, alkyd resin, epoxy resin, acrylic resin, unsaturated polyester obtained by polycondensation of maleic anhydride, terephthalic acid, and polyhydric alcohol, urea resin, melamine resin, urea-melamine resin, xylene resin, toluene resin, guanamine resin, melamine-guanamine resin, acetoguanamine resin, glyptal resin, furan resin, silicone resin, polyimide, polyamide-imide resin, polyetherimide resin, polyurethane resin.

Examples of the method of filling the voids of porous-shaped ferrite particles with the resin components include a method that dilutes the resin components in a solvent and adds to the porous magnetic core particles in the diluted solution. The solvent used here may be any solvent that can dissolve each resin component. When the resin is soluble in an organic solvent, one may use an organic solvent such as toluene, xylene, cellosolve butyl acetate, methyl ethyl ketone, methyl isobutyl ketone, or methanol. Further, when it is a water-soluble resin component or an emulsion-type resin component, water may be used. Examples of the method of adding the solvent-diluted resin components to the inside of the porous magnetic core particles include a method of impregnating the resin components by an application method such as a dipping method, a spraying method, a brushing method, a fluidized bed, and a kneading method, and then volatilizing the solvent. When the thermosetting resin is filled, the solvent is volatilized and then the temperature is raised to the curing temperature of the resin to be used to cause a curing reaction.

On the other hand, specific examples of the method of producing the magnetic material-dispersed resin particles include the following method. For example, they can be obtained by kneading a submicron magnetic material such as iron powder, magnetite particles, and ferrite particles so as to be dispersed in a thermoplastic resin and pulverized to a desired carrier particle diameter, which is subjected to a thermal or mechanical spheroidizing treatment, if necessary. Production is also possible by dispersing the magnetic material in the monomer and polymerizing the monomer to form a resin.

Examples of the resin in this case are resins such as vinyl resin, polyester resin, epoxy resin, phenolic resin, urea resin, polyurethane resin, polyimide resin, cellulose resin, silicone resin, acrylic resin, and polyether resin. The resin may be one kind or a mixed resin of two or more kinds. In particular, phenolic resin is preferable in that it increases the strength of the carrier core. The true density and specific resistance can be adjusted by adjusting the amount of magnetic material. Specifically, in the case of magnetic material particles, it is preferable to add 70% by mass or more and 95% by mass or less based on the carriers.

The carrier core preferably has a volume-based 50% diameter (D50) of 20 μm or more and 80 μm or less in that the coating resin can be uniformly coated, and the density of the developer magnetic brush for preventing carrier adhesion and obtaining a high-quality image can be appropriately adjusted.

As for the specific resistance of the carrier core, it is preferable that the specific resistance value at an electric field strength of 1000 (V/cm) is $1.0\times10^{5}$ (Ω·cm) or more and $1.0\times10^{14}$ (Ω·cm) or less because good developability can be obtained.

<Coating Resin Coating Method>

The method of coating the surface of the carrier core with the coating resin is not particularly limited, and a known method can be used. For example, there is a so-called dipping method in which the solvent is volatilized while agitating the carrier core and the coating resin solution to coat the surface of the carrier core with the coating resin. Specific examples thereof include a universal mixing agitator (manufactured by Fuji Paudal Co, Ltd.) and a Nauta mixer (manufactured by Hosokawa Micron Corporation). There is also a method of spraying a coating resin solution from a spray nozzle while forming a fluidized layer to coat the surface of the carrier core with the coating resin. Specific examples include SPIRA COTA (manufactured by Okada Seiko Co., Ltd.) and SPIR-A-FLOW (manufactured by Freund Corporation). There is also a method of dry-coating the magnetic carrier core with the coating resin in the form of particles. Specific examples include a treatment method using an apparatus such as Hybridizer (manufactured by Nara Machinery Co., Ltd.). Mechanofusion (manufactured by Hosokawa Micron Corporation), High Flex Gral (manufactured by Fukae Powtec), and Theta Composer (manufactured by TOKUJU Co., LTD).

<Magnetic Carrier>

Next, the magnetic carrier is described.

The magnetic carrier preferably has a magnetization strength of 40 ($Am^2/kg$) or more and 70 ($Am^2/kg$) or less under a magnetic field of $5000/4\pi$ (kA/m). When the magnetization strength of the magnetic carrier is within the above range, the magnetic binding force on the developing sleeve is appropriate, so that the occurrence of carrier adhesion can be better suppressed. Further, the stress applied to the toner in the magnetic brush can be reduced, so that deterioration of the toner and adhesion to other members can be better suppressed.

Further, the magnetization strength of the magnetic carrier can be appropriately adjusted by the amount of the resin contained. The residual magnetization of the magnetic carrier is preferably 20.0 ($Am^2/kg$) or less, and more preferably 10.0 ($Am^2/kg$) or less. When the residual magnetization of the magnetic carrier is within the above range, particularly good fluidity as a developer can be obtained, and good dot reproducibility can be obtained.

The magnetic carrier preferably has a true density of 2.5 $g/cm^3$ or more and 5.5 $g/cm^3$ or less, and more preferably 3.0 $g/cm^3$ or more and 5.0 $g/cm^3$ or less. A two-component developer containing magnetic carriers having true densities in this range has a small load on the toner and suppresses adhesion of toner constituents to the magnetic carriers. Further, a true density in this range is preferable for the magnetic carriers in order to achieve both good developability and prevention of carrier adhesion at low electric field strength.

It is preferable that the volume-based 50% diameter (D50) of the magnetic carrier is 21 μm or more and 81 μm or less from the viewpoints of the ability to impart charge to the toner, the suppression of carrier adhesion to the image region, and the improvement of image quality. More preferably, it is 25 μm or more and 60 μm or less.

Next, a method of measuring various physical properties of the carrier is described.

<Method of Measuring Volume-Based 50% Diameter (D50) of Magnetic Carrier>

The particle size distribution was measured with a laser diffraction/scattering type particle size distribution measuring device "Microtrac MT3300EX" (manufactured by Nikkiso Co., Ltd.).

The measurement of the volume-based 50% diameter (D50) of the magnetic carrier was carried out by attaching a sample feeder "One-Shot Dry-Type Sample Conditioner Turbotrac" (manufactured by Nikkiso Co., Ltd.) for dry measurement. As the feeding conditions for Turbotrac, a dust collector was used as a vacuum source, the air flow rate was about 33 l/sec, and the pressure was about 17 kPa. The control was automatically performed on software. For the particle diameter, the 50% particle diameter (D50), a cumulative value in the volume reference distribution, was obtained. Control and analysis were performed using the attached software (version 10.3.3-202D). The measurement conditions were as follows.

SetZero time: 10 seconds
Measurement time: 10 seconds
Number of measurements: 1 time
Particle refractive index: 1.81%
Particle shape: non-spherical
Upper limit of measurement: 1408 μm
Lower limit of measurement: 0.243 μm
Measurement environment: 23° C., 50% RH <Measurement of Specific Resistance of Magnetic Carrier>

Figure 4:
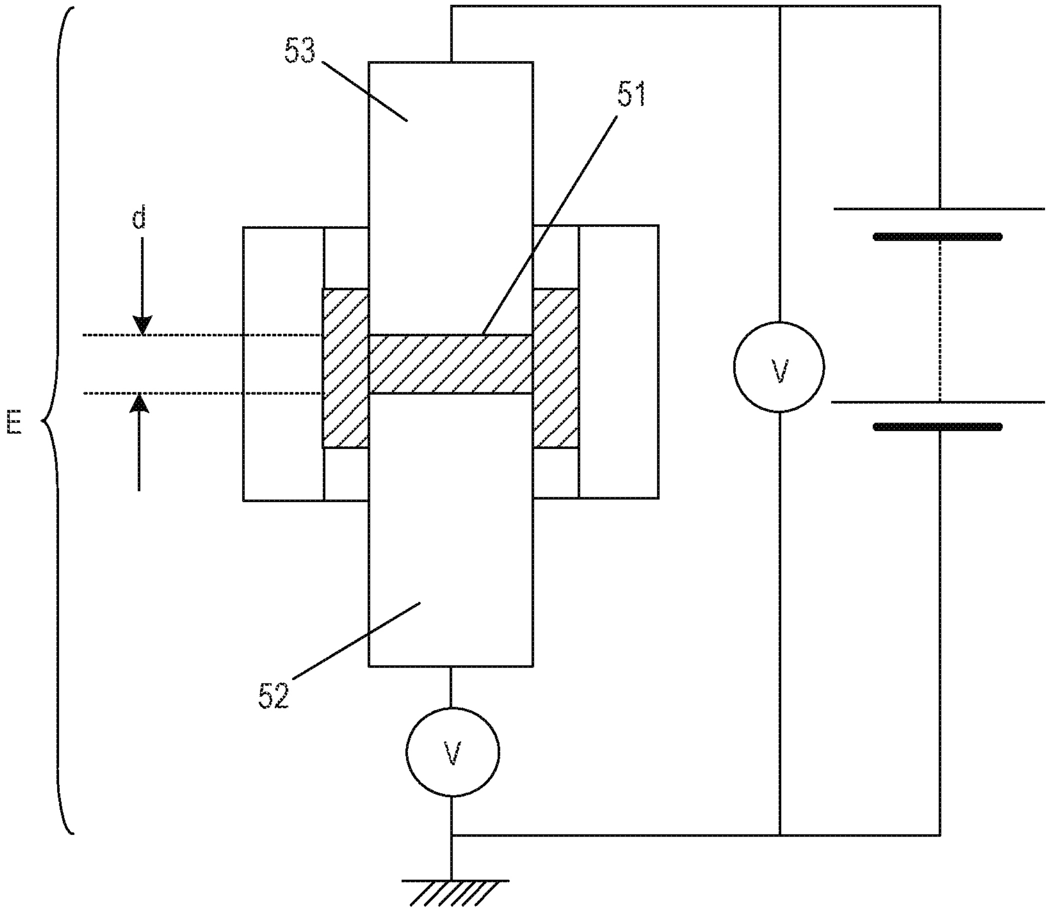
FIG. 4 is a schematic diagram of a measuring device for a specific resistance value of a magnetic carrier core of the present disclosure.

The specific resistance value of the magnetic carrier is determined by using the measuring device shown in FIG. 4.

The measurement of specific resistance uses a method that determines the specific resistance by filling the cell E with carriers, placing a lower electrode 52 and an upper electrode 53 in contact with the carrier particles 51, applying a voltage between these electrodes, and measuring the current flowing at that time. The measurement conditions for specific resistance in the present disclosure are such that the contact area S between the filling carriers and the electrodes=about 2.4 $cm^2$, the sample thickness d=about 0.2 cm, and the load of the upper electrode 240 g (2.35 N). As the voltage application conditions, the application conditions (I), (II), and (III) are applied in this order, and the current at the applied voltage under the application condition (III) is measured. After that, the thickness d of the sample was accurately measured, and the specific resistance (Ω·cm) at each electric field strength (V/cm) was calculated, so that the specific resistance at an electric field strength of 3000 V/cm was defined as the specific resistance of the magnetic carriers of the sample.

Application Conditions (I): (Changed from 0 V to 1000 V: increased by 200 V stepwise every 30 seconds)
(II): (Held at 1000 V for 30 seconds)
(III): (Changed from 1000 V to 0 V: decreased by 200 V stepwise every 30 seconds)

$$\text{Specific Resistance of Magnetic Carrier } (\Omega\cdot\text{cm}) = (\text{Applied Voltage } (V)/\text{Measured Current } (A)) \times S\ (\text{cm}^2)/d\ (\text{cm})$$

$$\text{Electric Field Strength } (V/\text{cm}) = \text{Applied Voltage } (V)/d\ (\text{cm})$$

Note that the specific resistance of the magnetite fine particles used in the magnetic material-dispersed resin carriers was also measured in the same manner <Measurement Method of Magnetization Strength of Carrier Core>

The magnetization strength of the carrier core can be determined by a vibrating magnetic field type magnetic characteristic measuring device (vibrating sample magnetometer) or a direct current magnetization characteristic recording device (BH tracer). In the examples described later, measurement is performed by the following procedure with a vibrating magnetic field type magnetic characteristic measuring device BHV-30 (manufactured by Riken Denshi Co., Ltd.).

The sample is a cylindrical plastic container filled with a carrier core sufficiently tightly. The actual mass of the sample filled in the container is measured. After that, the sample in the plastic container is glued with an instant adhesive so that the sample does not move.

The external magnetic field axis and the magnetization moment axis are calibrated at $5000/4\pi$ (kA/m) using a standard sample.

The magnetization strength was measured from a loop of magnetization moments to which an external magnetic field of 5000/4π (kA/m) was applied at a sweep speed of 5 (min/loop). From these, the magnetization strength of the carrier core ($Am^2/kg$) is obtained by dividing by the weight of the sample.

<Measurement of True Density of Magnetic Carrier>

The true density of magnetic carrier particles can be determined by a dry automatic densitometer auto pycnometer.

<Separation of Coating Resin Layer from Magnetic Carriers and Separation of Coating Resins A and B in Coating Resin Layer>

As a method of separating the coating resin layer from the magnetic carriers, there is a method of taking the magnetic carriers in a cup and eluting the coating resin with toluene.

After the eluted resin is dried to dryness, it is dissolved in tetrahydrofuran (THF) and separated using the following apparatuses.

[Apparatus Configuration]

LC-908 (manufactured by Japan Analytical Industry)

JRS-86 (same company; repeat injector)

JAR-2 (same company; autosampler)

FC-201 (Gilson; fraction collector)

[Column Structure]

JAIGEL-1H to 5H (20φ×60) mm: preparative column) (manufactured by Japan Analytical Industry)

[Measurement Condition]

Temperature: 40° C.

Solvent: THF

Flow rate: 5 ml/min.

Detector: RI

Based on the molecular weight distribution of the coating resin, the resin composition specified by the following method is used to measure in advance the elution time that gives the peak molecular weight (Mp) of the coating resin A and the coating resin B. Before and after that, each resin component is separated. After that, the solvent is removed and dried to obtain a coating resin A and a coating resin B.

Note that a Fourier transform infrared spectroscopic analyzer (Spectrum One: manufactured by PerkinElmer) can be used to specify the atomic group from the absorption wave number, and specify the resin configurations of the coating resin A and the coating resin B. Further, the detailed structure can be specified by using NMR (nuclear magnetic resonance spectroscopy).

<Measurement of Weight Average Molecular Weight (Mw), Peak Molecular Weight (Mp), and Content Ratio of Coating Resin A, Coating Resin B, and Coating Resin Layer in Coating Resin Layer>

The weight average molecular weight (Mw) and peak molecular weight (Mp) of the coating resin A, the coating resin B, and the coating resin layer are measured by the following procedure using gel permeation chromatography (GPC).

First, the measurement sample is prepared as follows.

A sample (coating resin separated from the magnetic carriers, coating resin A and coating resin B separated by a preparative device) and tetrahydrofuran (THF) were mixed at a concentration of 5 mg/ml, which was dissolved in THF by allowing it to stand at room temperature for 24 hours. After that, a sample that had passed through a sample processing filter (Myshori Disc H-25-2, manufactured by Tosoh Corporation) was used as a GPC sample. Next, a GPC measuring device (HLC-8120GPC manufactured by Tosoh Corporation) was used to perform measurement under the following measurement conditions according to the operation manual of the device.

(Measurement Condition)

Apparatus: high-speed GPC "HLC8120 GPC" (manufactured by Tosoh Corporation)

Column: 7-series of Shodex KF-801, 802, 803, 804, 805, 806, 807 (manufactured by Showa Denko K.K.)

Eluent: THF

Flow velocity: 1.0 ml/min

Oven temperature: 40.0° C.

Sample injection amount: 0.10 ml

Further, in calculating the weight average molecular weight (Mw) and the peak molecular weight (Mp) of the sample, a molecular weight calibration curve prepared with a standard polystyrene resin (TSK Standard Polystyrene F-850, F-450, F-288, F-128, F-80, F-40, F-20, F-10, F-4, F-2, F-1, A-5000, A-2500, A-1000, or A-500 manufactured by Tosoh Corporation) is used as the calibration curve. The content ratio is determined by the peak area ratio of the molecular weight distribution measurement.

<Quantification of Coating Amount of Carrier Coating Resin>

The measuring devices used are an automatic sample combustion device AQF-100 (manufactured by Mitsubishi Chemical Corporation) and an ion chromatograph ICS-2000 (manufactured by Dionex). The measurement principle is as follows: The sample is combusted with an automatic sample combustion device, and hydrogen peroxide solution ($H_2O_2$) is used as an absorption liquid, the fluorine elements in the fluororesin are allowed to be present as $F^-$, and $PO_4^{3-}$ is used as an internal standard substance, and quantification is performed by ion chromatography.

The measurement conditions of the automatic sample combustion device AQF-100 (manufactured by Mitsubishi Chemical Corporation) are as follows.

Inlet Temp.: 900° C.

Outlet Temp.: 1000° C.

$Ar/O_2$: 200 ml/min $O_2$: 400 ml/min

1st position: 150 mm/60 s

End Time: 360 s

Cool Time: 30 s

Boat Speed: 10 mm/s

The measurement conditions of the ion chromatograph ICS-2000 (manufactured by Dionex) are as follows.

Separation column: AG12A/AS12A

Injection volume: 25 μl

Eluent: 1 mM→40 mM (20 min) Eluent generator is used and the gradient elution method is used.

Flow rate: 1.0 ml/min

Column oven: 35° C.

Next, in the present disclosure, the composition of a toner that is used together with a carrier as a two-component developer or a replenishing developer and is preferable for achieving the aspect thereof will be described in detail below <Binder Resin>

For the toner particles in the present disclosure, the following polymer or the like can be used as the binder resin. Examples thereof include styrenes such as polystyrene, poly-p-chlorostyrene, polyvinyltoluene and homopolymers of their substitutions; styrene-based copolymers such as styrene-p-chlorostyrene copolymer, styrene-vinyltoluene copolymer, styrene-vinylnaphthalene copolymer, styrene-acrylic acid ester copolymer, and styrene-methacrylic acid ester copolymer; a hybrid resin in which a styrene-based copolymer resin, a polyester resin, or a polyester resin is mixed or partially reacted with a vinyl-based resin: polyvinyl chloride, phenolic resin, natural modified phenolic resin, natural resin modified maleic acid resin, acrylic resin, methacrylic resin, polyvinyl acetate, silicone resin, polyester resin, polyurethane, polyamide resin, furan resin, epoxy resin, xylene resin, polyethylene resin, polypropylene resin, and the like. Among them, it is preferable to use polyester resin as a main component from the viewpoint of low temperature fixability.

As the monomer used for the polyester unit of the polyester resin, a polyhydric alcohol (a dihydric, trihydric, or higher alcohol), a polyvalent carboxylic acid (a divalent, trivalent, or higher carboxylic acid), and an acid anhydride thereof or a lower alkyl ester thereof is used. Here, in order to exhibit "strain curability," it is effective to partially crosslink an amorphous resin in its molecule in order to prepare a branched polymer. For that purpose, it is preferable to use a polyfunctional compound having a valence of 3 or more. Therefore, it is preferable that the raw material monomer of the polyester unit contains a carboxylic acid having a valence of 3 or higher, an acid anhydride thereof or a lower alkyl ester thereof, and/or an alcohol having a valence of 3 or higher.

As the polyhydric alcohol monomer used in the polyester unit of the polyester resin, the following polyhydric alcohol monomers can be used.

Examples of the dihydric alcohol component include ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, hydrogenated bisphenol A, and the bisphenol represented by the formula (A) and derivatives thereof:

(A)

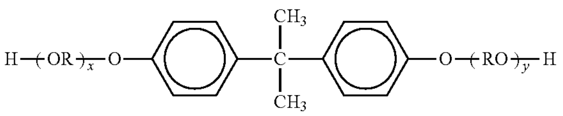

(In the formula, R is an ethylene or propylene group, x and y are each an integer of 0 or more, and the average value of x+y is 0 or more and 10 or less.)

Diols Represented by the Formula (B):

(B)

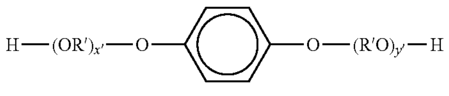

(In the formula, R' represents $-CH_2CH_3-$ or 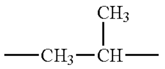 or

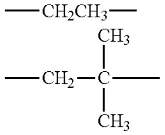

x' and y' are each an integer of 0 or more, and the average value of x'+y' is 0 or more and 10 of less.)

Examples of the trihydric or higher alcohol component include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, and 1,3,5-trihydroxymethylbenzene. Among these, glycerol, trimethylolpropane, and pentaerythritol are preferably used. These divalent alcohols, trihydric, and higher alcohols can be used alone or in combination of two or more.

The following polyvalent carboxylic acid monomers can be used as the polyvalent carboxylic acid monomer used in the polyester unit of the polyester resin.

Examples of the divalent carboxylic acid component include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenyl succinic acid, isododecenyl succinic acid, n-dodecyl succinic acid, isododecyl succinic acid, n-octenyl succinic acid, n-octyl succinic acid, isooctenyl succinic acid, isooctyl succinic acid, anhydrides of these acids, and lower alkyl esters thereof. Among these, maleic acid, fumaric acid, terephthalic acid, and n-dodecenyl succinic acid are preferably used.

Examples of the trivalent and higher carboxylic acids, acid anhydrides thereof, and lower alkyl esters thereof include 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxy-2-methyl-2-methylenecarboxypropane, 1,2,4-cyclohexanetricarboxylic acid, tetra(methylene carboxyl) methane, 1,2,7,8-octanetetracarboxylic acid, pyromellitic acid, empol trimer acid, acid anhydrides thereof, and lower alkyl esters thereof. Among these, 1,2,4-benzenetricarboxylic acid, that is, trimellitic acid or a derivative thereof is preferably used because it is inexpensive and reaction control is easy. These divalent carboxylic acids and the like and trivalent or higher carboxylic acids can be used alone or in combination of two or more.

The method of producing a polyester unit of the present disclosure is not particularly limited, and a known method can be used. For example, the above-mentioned alcohol monomer and carboxylic acid monomer are simultaneously charged and polymerized through an esterification reaction or transesterification reaction and a condensation reaction to produce a polyester resin. Further, the polymerization temperature is not particularly limited, but is preferably in the range of 180° C. or higher and 290° C. or lower. In the polymerization of the polyester unit, for example, a polymerization catalyst such as a titanium-based catalyst, a tin-based catalyst, zinc acetate, antimony trioxide, or germanium dioxide can be used. In particular, the binder resin of the present disclosure is more preferably a polyester unit polymerized using a tin-based catalyst.

In addition, the acid value of the polyester resin is preferably 5 mgKOH/g or more and 20 mgKOH/g or less, and the hydroxyl value is preferably 20 mgKOH/g or more and 70 mgKOH/g or less from the viewpoint of fogging because the amount of water adsorbed in a high temperature and high humidity environment is suppressed, making it possible to suppress the non-electrostatic adhesive force to low.

Further, the binder resin may be used by mixing a low molecular weight resin and a high molecular weight resin. The content ratio of the high molecular weight resin to the low molecular weight resin is preferably 40/60 or more and 85/15 or less on a mass basis from the viewpoint of low temperature fixability and hot offset resistance.

<Release Agent>

Examples of the wax used for the toner of the present disclosure include the following. Hydrocarbon-based waxes such as low molecular weight polyethylene, low molecular weight polypropylene, alkylene copolymers, microcrystalline wax, paraffin wax, Fischer-Tropsch wax; hydrocarbon-based wax oxides such as polyethylene oxide wax or block copolymers thereof; waxes containing fatty acid ester as the main component such as carnauba wax; ones with part or all of fatty acid esters deoxidized such as deoxidized carnauba wax. In addition, the following can be mentioned. Saturated linear fatty acids such as palmitic acid, stearic acid, and montanic acid; unsaturated fatty acids such as brassidic acid, eleostearic acid, and parinaric acid; saturated alcohols such as stearyl alcohol, aralkyl alcohol, behenyl alcohol, carnaubyl alcohol, ceryl alcohol, and mericyl alcohol; polyhydric alcohols such as sorbitol: esters of fatty acids such as palmitic acid, stearic acid, behenic acid, and montanic acid with alcohols such as stearyl alcohol, aralkyl alcohol, behenyl alcohol, carnaubyl alcohol, ceryl alcohol, and mericyl alcohol; fatty acid amides such as linoleic acid amides, oleic acid amides, and lauric acid amides; saturated fatty acid bisamides such as methylene bisstearic acid amide, ethylene biscapric acid amide, ethylene bislauric acid amide, and hexamethylene bisstearic acid amide; unsaturated fatty acid amides such as ethylene bisoleic acid amides, hexamethylene bisoleic acid amides, N,N'-dioleyl adipic acid amides, and N,N'-dioleyl sebacic acid amides, aromatic bisamides such as m-xylene bisstearic acid amide and N,N'-distearyl isophthalic acid amide; aliphatic metal salts such as calcium stearate, calcium laurate, zinc stearate, and magnesium stearate (commonly referred to as metal soap); waxes obtained by grafting an aliphatic hydrocarbon-based wax with a vinyl-based monomer such as styrene or acrylic acid; partially esterified products of fatty acids such as behenic acid monoglycerides with polyhydric alcohols; and methyl ester compounds having hydroxyl groups obtained by hydrogenation of vegetable oils and fats.

Among these waxes, hydrocarbon waxes such as paraffin wax and Fischer-Tropsch wax, or fatty acid ester waxes such as carnauba wax are preferable from the viewpoint of improving low temperature fixability and fixing-separating property. In the present disclosure, the hydrocarbon-based wax is more preferable in that the hot offset resistance is further improved.

In the present disclosure, the wax is preferably used in an amount of 3 parts by mass or more and 8 parts by mass or less based on 100 parts by mass of the binder resin.

Further, in the endothermic curve at the time of temperature rise measured by the differential scanning calorimetry (DSC) device, the peak temperature of the maximum endothermic peak of the wax is preferably 45° C. or higher and 140° C. or lower. It is preferable that the peak temperature of the maximum endothermic peak of the wax is within the above range because both the storage stability of the toner and the hot offset resistance can be achieved.

<Colorant>

The toner particles in the present disclosure may contain a colorant. Examples of the colorant include the following.

Examples of black colorants include carbon black; and those colored black with a yellow colorant, a magenta colorant, and a cyan colorant. As the colorant, a pigment may be used alone, but it is more preferable to improve the clearness by using a dye and a pigment in combination from the viewpoint of the image quality of full-color images.

Examples of the magenta toner pigment include the following. C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, and 282; C.I. Pigment Violet 19; and C.I. Vat Red 1, 2, 10, 13, 15, 23, 29, and 35.

Examples of the magenta toner dye include the following. C.I. Solvent Red 1, 3, 8, 23, 24, 25, 27, 30, 49, 81, 82, 83, 84, 100, 109, and 121; C.I. Disperse Red 9; C.I. Solvent Violet 8, 13, 14, 21, 27; oil-soluble dyes such as C.I. Disperse Violet 1, and C.I. Basic Red 1, 2, 9, 12, 13, 14, 15, 17, 18, 22, 23, 24, 27, 29, 32, 34, 35, 36, 37, 38, 39, and 40: and basic dyes such as C.I. Basic Violet 1, 3, 7, 10, 14, 15, 21, 25, 26, 27, 28.

Examples of the cyan toner pigment include the following. C.I. Pigment Blue 2, 3, 15:2, 15:3, 15:4, 16, and 17; C.I. Vat Blue 6; and C.I. Acid Blue 45, and copper phthalocyanine pigment in which 1 to 5 phthalimide methyl groups are substituted in the phthalocyanine skeleton.

Examples of the cyan toner dye include C.I. Solvent Blue 70.

Examples of the yellow toner pigment include the following. C.I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, and 185; and C.I. Vat Yellow 1, 3, and 20.

Examples of the yellow toner dye include C.I. Solvent Yellow 162.

These colorants can be used alone or in admixture, and even in the form of a solid solution. The colorant is selected in terms of hue angle, saturation, lightness, light resistance, OHP transparency, and dispersibility in toner.

The content of the colorant is preferably 0.1 part by mass or more and 30.0 parts by mass or less based on 100 parts by mass of the total amount of the resin component.

<Inorganic Fine Particles>

The toner preferably contains inorganic fine particles for the main purpose of enhancing fluidity and chargeability, and is preferably in the form of being adhered to the toner surface.

As the inorganic fine particles as spacer particles for enhancing the releasability between the toner and the carriers, silica particles having a maximum peak particle diameter of 80 nm or more and 200 nm or less based on the number distribution are preferable. In order to better suppress desorption from the toner while functioning as spacer particles, it is more preferably 100 nm or more and 150 nm or less.

Further, in order to improve the fluidity of the toner, it is preferable to contain inorganic fine particles having a maximum peak particle diameter of 20 nm or more and 50 nm or less based on the number distribution, and it is also preferable to use the silica particles in combination.

Further, other external additives may be added to the toner particles in order to improve the fluidity and transferability. The external additive added to the surface of the toner particles preferably contains inorganic fine particles such as titanium oxide, alumina oxide, and silica, and multiple types may be used in combination.

The total content of the external additive is preferably 0.3 parts by mass or more and 5.0 parts by mass or less, and more preferably 0.8 parts by mass or more and 4.0 parts by mass or less, based on 100 parts by mass of the toner particles. Among them, the content of silica particles having a maximum peak particle diameter of 80 nm or more and 200 nm or less based on the number distribution is 0.1 parts by mass or more and 2.5 parts by mass or less, and more preferably 0.5 parts by mass or more and 2.0 parts by mass or less. Within this range, the effect becomes more significant as spacer particles.

Further, it is preferable that the surfaces of silica particles and inorganic fine particles used as an external additive are hydrophobized. The hydrophobization treatment is preferably performed by a coupling agent such as various titanium coupling agents and silane coupling agents; fatty acids and metal salts thereof: silicone oils; or a combination thereof.

Examples of the titanium coupling agent include the following. Tetrabutyl titanate, tetraoctyl titanate, isopropyl triisostearoyl titanate, isopropyl tridecyl benzenesulfonyl titanate, bis(dioctyl pyrophosphate)oxyacetate titanate.

In addition, examples of the silane coupling agent include the following. γ-(2-aminoethyl) aminopropyltrimethoxysilane, γ-(2-aminoethyl) aminopropyl methyldimethoxysilane, γ-methacryloxypropyltrimethoxysilane, N—O—(N-vinyl benzylaminoethyl) γ-aminopropyltrimethoxysilane hydrochloride, hexamethyldisilazane, methyltrimethoxysilane, butyltrimethoxysilane, isobutyltrimethoxysilane, hexyltrimethoxysilane, octyltrimethoxysilane, decyltrimethoxysilane, dodecyltrimethoxysilane, phenyltrimethoxysilane, o-methylphenyl trimethoxysilane, p-methylphenyl trimethoxysilane.

Examples of fatty acids include the following. Long-chain fatty acids such as undecylic acid, lauric acid, tridecylic acid, dodecylic acid, myristic acid, palmitic acid, pentadecylic acid, stearic acid, heptadecylic acid, arachic acid, montanic acid, oleic acid, linoleic acid, and arachidonic acid. Examples of the metal of these fatty acid metal salts include zinc, iron, magnesium, aluminum, calcium, sodium, and lithium.

Examples of the silicone oil include dimethyl silicone oil, methyl phenyl silicone oil, and amino-modified silicone oil.

The hydrophobization treatment is preferably performed by adding a hydrophobization agent at 1% by mass or more and 30% by mass or less (more preferably 3% by mass or more and 7% by mass or less) based on the particles to be treated to the particles to be treated to coat the particles to be treated.

The degree of hydrophobization of the hydrophobized external additive is not particularly limited, but for example, the degree of hydrophobization after treatment is preferably 40 or more and 98 or less. The degree of hydrophobization indicates the wettability of a sample to methanol and is an index of hydrophobicity.

When the toner of the present disclosure is to be mixed with a magnetic carrier and used as a two-component developer, if the toner concentration in the developer is 2% by mass or more and 15% by mass or less, preferably 4% by mass or more and 13% by mass or less, favorable results are usually obtained with regard to the carrier mixing ratio in that case. When the toner concentration is less than 2% by mass, the image density tends to decrease, and when it exceeds 15% by mass, fogging and in-machine scattering are likely to occur.

Further, in the replenishing developer for replenishing the developing device according to the decrease in the toner concentration of the two-component developer in the developing device, the amount of toner is 2 parts by mass or more and 50 parts by mass or less based on 1 part by mass of the replenishing magnetic carriers.

Next, an image forming apparatus including a developing apparatus using the magnetic carrier, the two-component developer, and the replenishing developer of the present disclosure is described with reference to examples, but the developing apparatus used in the developing method of the present disclosure is not limited to this.

<Image Forming Method>

In FIG. 1, the electrostatic latent image bearing member 1 rotates in the direction of the arrow in the figure. The electrostatic latent image bearing member 1 is charged by the charging device 2 which is a charging means, and the surface of the charged electrostatic latent image bearing member 1 is exposed by an exposure device 3 which is an electrostatic latent image forming means to form an electrostatic latent image. The developing device 4 includes a developing container 5 that houses a two-component developer, and the developer support 6 is arranged in a rotatable state, and magnets 7 are included in the developer support 6 as a magnetic field generating means. At least one of the magnets 7 is installed so as to face the latent image bearing member. The two-component developer is held on the developer support 6 by the magnetic field of the magnets 7, and the amount of the two-component developer is regulated by the regulating member 8, and is transported to the developing unit facing the electrostatic latent image bearing member 1. In the developing unit, a magnetic brush is formed by the magnetic field generated by the magnets 7. After that, an alternating electric field is superimposed on the direct current electric field to apply a development bias, whereby the electrostatic latent image is visualized as a toner image. The toner image formed on the electrostatic latent image bearing member 1 is electrostatically transferred to the recording medium (transfer material) 12 by the transfer charging device 11. Here, as shown in FIG. 2, the electrostatic latent image bearing member 1 may be temporarily transferred to the intermediate transferer 9, and then electrostatically transferred to the recording medium 12.

After that, the recording medium 12 is transported to the fixing device 13, where the recording medium 12 is heated and pressed to fix the toner thereon. After that, the recording medium 12 is discharged to the outside of the apparatus as an output image. After the transfer step, the toner remaining on the electrostatic latent image bearing member 1 is removed by the cleaner 15. After that, the electrostatic latent image bearing member 1 cleaned by the cleaner 15 is electrically initialized by irradiation with light from the pre-exposure 16, and the above image forming operation is repeated.

Figure 2:
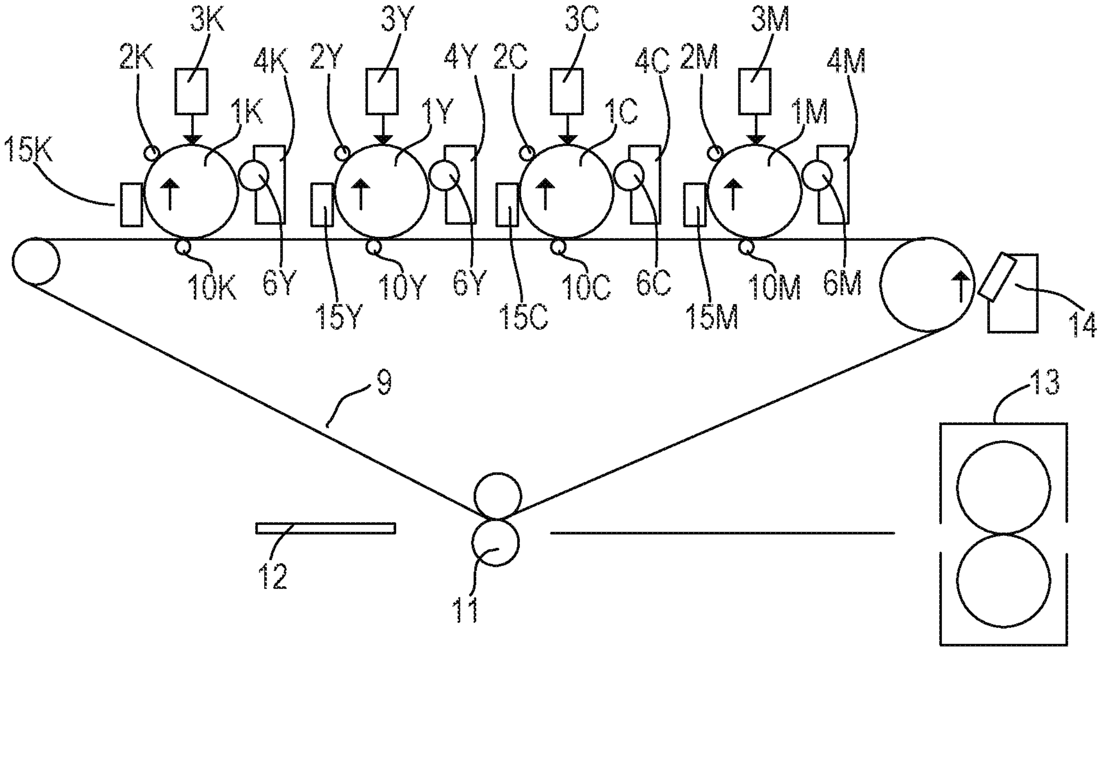
FIG. 2 is a schematic diagram of an image forming apparatus suitable for full-color image formation using the present disclosure.

FIG. 2 shows an example of a schematic diagram in which the image forming method of the present disclosure is applied to a full-color image forming apparatus.

The arrangement of image forming units such as K, Y, C, and M in the figure and the arrow indicating the rotation direction are not limited thereto. Note that K means black, Y means yellow, C means cyan, and M means magenta. In FIG. 2, the electrostatic latent image bearing members 1K, 1Y, 1C, and 1M rotate in the direction of the arrow in the figure. The electrostatic latent image bearing members are charged by the charging devices 2K, 2Y, 2C, and 2M as charging means, and the surface of each charged electrostatic latent image bearing member is exposed by an exposure device 3K, 3Y, 3C, or 3M, which is an electrostatic latent image forming means, to form an electrostatic latent image. After that, the electrostatic latent image is visualized as a toner image by the two-component developer supported on the developer supports 6K, 6Y, 6C, and 6M included in the developing devices 4K, 4Y, 4C, and 4M as developing means. Further, it is transferred to the intermediate transferer 9 by the intermediate transfer charging device 10K, 10Y, 10C, 10M as a transfer means. Further, it is transferred to the recording medium 12 by the transfer charging device 11 as a transfer means, and the recording medium 12 is fixed by heating pressure by the fixing device 13 as a fixing means and is outputted as an image. Then, the intermediate transferer cleaner 14, which is a cleaning member of the intermediate transferer 9, collects the transfer residual toner and the like. Specifically, as the developing method of the present disclosure, it is preferable to apply an alternating voltage to the developer support to form an alternating electric field in the developing region and perform development in a state where the magnetic brush is in contact with the photoconductor. The distance (distance between S-D) between the developer support (developing sleeve) 6 and the photosensitive drum is 100 μm or more and 1000 μm or less, which is good for preventing carrier adhesion and improving dot reproducibility. If it is shorter than 100 μm, the supply of the developer tends to be insufficient and the image density becomes low. If it exceeds 1000 μm, the magnetic field lines from the magnetic pole Si spread and the density of the magnetic brush becomes low, the dot reproducibility is deteriorated, the force for restraining the magnetic coat carriers is weakened, and carrier adhesion is likely to occur.

The voltage (Vpp) between the peaks of the alternating electric field is 300 V or more and 3000 V or less, preferably 500 V or more and 1800 V or less. Also, the frequency is 500 Hz or more and 10000 Hz or less, preferably 1000 or more and 7000 Hz or less, and each of them can be appropriately selected and used depending on the process. In this case, examples of the alternating bias waveform for forming the alternating electric field include a triangular wave, a square wave, a sine wave, and a waveform in which the duty ratio is changed. Occasionally, in order to cope with the change in formation rate of the toner image, it is preferable to apply a development bias voltage (intermittent alternating superimposition voltage) having a discontinuous alternating bias voltage to the developer support for development. If the applied voltage is lower than 300 V, it is difficult to obtain a sufficient image density, and it may be impossible to satisfactorily collect the fog toner in the non-image area. In addition, if the voltage exceeds 3000 V, the latent image may be disturbed via the magnetic brush, resulting in deterioration of image quality.

The use of a two-component developer having a well-charged toner makes it possible to lower the fog removal voltage (Vback), and lower the primary charge of the photoconductor, thus extending the life of the photoconductor. The Vback is 200 V or less, more preferably 150 V or less, although it depends on the developing system. As the contrast potential, 100 V or more and 400 V or less is preferably used so as to obtain a sufficient image density.

Further, when the frequency is lower than 500 Hz, the configuration of the electrostatic latent image-bearing photoconductor is usually the same as that of the photoconductor used in the image forming apparatus, although it depends on the process speed. Examples include a photoconductor having a structure in which a conductive layer, an undercoat layer, a charge generation layer, a charge transport layer, and a charge injection layer, if necessary, are sequentially provided on a conductive substrate such as aluminum or SUS.

The conductive layer, the undercoat layer, the charge generation layer, and the charge transport layer may be those usually used for a photoconductor. As the outermost surface layer of the photoconductor, for example, a charge injection layer or a protective layer may be used.

<Toner Production Method>

The method of producing toner particles is not particularly limited, but the pulverization method is preferable from the viewpoint of dispersing a polymer in which a styrene acrylic polymer is graft-polymerized to a release agent or polyolefin. The reason is that when toner particles are produced in an aqueous medium, a polymer in which a styrene acrylic polymer is graft-polymerized to a highly hydrophobic release agent or polyolefin tends to be localized inside the toner particles. Therefore, it becomes difficult to form the core-shell structure by the heat treatment apparatus described above.

Hereinafter, the toner production procedure by the pulverization method is described.

In the raw material mixing step, as a material constituting the toner particles, for example, a binder resin, a release agent, a colorant, a crystalline polyester, and if necessary, an additional component such as a charge control agent are weighed in a predetermined amount, blended, and mixed. Examples of the mixing apparatus include a double-cone mixer, a V-type mixer, a drum-type mixer, a Super Mixer, a Henschel Mixer, a Nauta mixer, a Mechano Hybrid (manufactured by Nippon Coke & Engineering. Co., Ltd.), and the like.

Next, the mixed materials are melt-kneaded to disperse wax and the like in the binder resin. In the melt-kneading step, a batch type kneader such as a pressurizing kneader or a Banbury mixer or a continuous type kneader can be used, and a single-screw or double-screw extruder has become the mainstream because of its superiority in continuous production. Examples include a KTK type twin-screw extruder (manufactured by Kobe Steel, Ltd.), a TEM type twin-screw extruder (manufactured by Toshiba Machine Co., Ltd.), a PCM kneader (manufactured by Ikegai Corp.), a twin-screw extruder (manufactured by KCK Engineering), a co-kneader (manufactured by Buss AG), and a Kneadex (manufactured by Nippon Coke & Engineering. Co., Ltd.). Further, the resin composition obtained by melt-kneading may be expanded with two rolls or the like and cooled with water or the like in the cooling step.

Then, the cooled product of the resin composition is pulverized to a desired particle diameter in the pulverization step. In the pulverization step, after coarse pulverization with a pulverizer such as a crusher, a hammer mill, or a feather mill, further fine pulverization is performed with, for example, a Kryptron System (manufactured by Kawasaki Heavy Industries, Ltd.), a Super Rotor (manufactured by Nisshin Engineering Inc.), a Turbo Mill (manufactured by Freund Turbo), or an air jet type fine pulverizer.

After that, if necessary, classification is performed using a classification machine or a sieving machine such as an inertial classification type Elbow-Jet (manufactured by Nittetsu Mining Co., Ltd.), a centrifugal force classification type Turboplex (manufactured by Hosokawa Micron Corporation), a TSP Separator (manufactured by Hosokawa Micron Corporation), or a Faculty (manufactured by Hosokawa Micron Corporation).

After that, the surface of the toner particles is treated by heating to increase the circularity of the toner. For example, the surface treatment apparatus shown in FIG. 3 can be used to perform surface treatment with hot air.

The mixture quantitatively supplied by the raw material quantitative supply means 31 is guided to the introduction pipe 33 installed on the vertical line of the raw material supply means by the compressed gas adjusted by the compressed gas adjusting means 32. The mixture that has passed through the introduction pipe is uniformly dispersed by a conical protruding member 34 provided in the central portion of the raw material supply means, guided to a supply pipe 35 in eight directions extending radially, and guided to a processing chamber 36 for performing heat treatment.

At this time, the flow of the mixture supplied to the processing chamber is regulated by the regulating means 39 for regulating the flow of the mixture provided in the processing chamber. Therefore, the mixture supplied to the treatment chamber is heat-treated while swirling in the treatment chamber, and then cooled.

The hot air for heat-treating the supplied mixture is supplied from the hot air supply means 37, and is introduced by spirally swirling the hot air into the processing chamber by the swirling member 43 for swirling the hot air. As its configuration, the swirling member 43 for swirling the hot air has multiple blades, and the swirling of the hot air can be controlled with the number and angle thereof. The temperature of the hot air supplied into the processing chamber is preferably 100° C. to 300° C. at the outlet portion of the hot air supply means 37. If the temperature at the outlet portion of the hot air supply means is within the above range, it is possible to subject the toner particles to spheroidizing treatment uniformly while preventing fusion and coalescence of the toner particles due to overheating of the mixture.

Further, the heat-treated heat treatment toner particles are cooled by the cold air supplied from the cold air supply means 38, and the temperature supplied from the cold air supply means 38 is preferably −20° C. to 30° C. When the temperature of the cold air is within the above range, the heat treatment toner particles can be efficiently cooled, and fusion and coalescence of the heat treatment toner particles can be prevented without inhibiting the uniform spheroidizing treatment of the mixture. The absolute water content of the cold air is preferably 0.5 $g/m^3$ or more and 15.0 $g/m^3$ or less.

Next, the cooled heat treatment toner particles are collected by the collecting means 40 at the lower end of the processing chamber. Note that the tip of the collecting means is provided with a blower (not shown), and the blower is configured to suction and transport.

Further, the powder particle supply port 44 is provided so that the swirling direction of the supplied mixture and the swirling direction of the hot air are in the same direction, and the collecting means 40 of the surface treatment apparatus is provided on the outer peripheral portion of the processing chamber so as to maintain the swirling direction of the swirled powder particles. Further, the cold air supplied from the cold air supply means 38 is configured to be supplied horizontally and tangentially from the outer peripheral portion of the apparatus to the inner peripheral surface of the processing chamber. The swirling direction of the toner supplied from the powder supply port, the swirling direction of the cold air supplied from the cold air supply means, and the swirling direction of the hot air supplied from the hot air supply means are all in the same direction. Therefore, turbulence does not occur in the processing chamber, the swirling flow in the apparatus is strengthened, a strong centrifugal force is applied to the toner, and the dispersibility of the toner is further improved, so that it is possible to obtain a toner having a uniform shape and having few coalesced particles.

The average circularity of the toner is preferably 0.960 or more and 0.980 or less from the viewpoint of fog suppression because the non-electrostatic adhesive force can be suppressed low.

After that, it is divided into two sides, the fine powder side and the coarse powder side. For example, it is divided into two sides using an inertial classification type Elbow-Jet (manufactured by Nittetsu Mining Co., Ltd.). A desired amount of silica fine particles A is externally added to the surface of each of the divided heat treatment toner particles. Examples of the method of external addition treatment include a method of agitating and mixing using a mixing apparatus such as a double-cone mixer, a V-type mixer, a drum-type mixer, a Super Mixer, a Henschel Mixer, a Nauta mixer, a Mechano Hybrid (manufactured by Nippon Coke & Engineering. Co., Ltd.), or a Nobilta (manufactured by Hosokawa Micron Corporation) as an external addition machine. At that time, if necessary, an external additive other than silica fine particles such as a fluidizing agent may be externally added.

Next, a method of measuring various physical properties of toner and raw materials is described below.

<Method of Measuring Weight Average Particle Diameter (D4) and Number Average Particle Diameter (D1)>

The measurement of the weight average particle diameter (D4) and number average particle diameter (D1) of toner involved the use of a precision particle size distribution measuring device "Coulter Counter Multisizer 3" (registered trademark, manufactured by Beckman Coulter) equipped with a 100 μm aperture tube by the pore electrical resistance method and dedicated software "Beckman Coulter Multisizer 3 Version 3.51" for setting measurement conditions and analyzing measurement data (manufactured by Beckman Coulter). The measurement was performed with 25,000 effective measurement channels, and the measurement data was analyzed and calculated.

As an electrolytic aqueous solution used for the measurement, it is possible to use one obtained by dissolving special grade sodium chloride in ion-exchanged water to a concentration of about 1% by mass, for example, "ISOTON II" (manufactured by Beckman Coulter).

Note that before performing the measurement and analysis, the dedicated software was set as follows.

At "Change Standard Measurement Method (SOM) Screen" of the dedicated software, the total number of counts in the control mode is set to 50000 particles, the number of measurements to 1, and the Kd value is set to a value obtained by using "Standard Particles 10.0 μm" (manufactured by Beckman Coulter). Pressing the threshold/noise level measurement button automatically sets the threshold and noise levels. Also, set the current to 1600 μA, the gain to 2, and the electrolyte to ISOTON II, and check the flash of the aperture tube after measurement.

At "Convert Setting from Pulse to Particle Diameter Screen" of the dedicated software, the bin spacing is set to logarithmic particle diameter, the particle diameter bin to 256 particle diameter bins, and the particle diameter range from 2 μm to 60 μm.

The specific measurement method is as follows.

(1) Put about 200 ml of the electrolytic aqueous solution in a 250 ml round bottom beaker made of glass exclusively for Multisizer 3, set it on a sample stand, and agitate the stirrer rod counterclockwise at 24 rotations/sec. Then, remove the dirt and air bubbles in the aperture tube with the "Aperture Flash" function of the analysis software.

(2) Put about 30 ml of the electrolytic aqueous solution in a 100 ml flat bottom beaker made of glass. To this, add about 0.3 ml of a diluted solution of "Contaminon N" (a 10% by mass aqueous solution of a neutral detergent for cleaning precision measuring instruments with a pH of 7, composed of a nonionic surfactant, an anionic surfactant, and an organic builder, manufactured by Wako Pure Chemical Industries, Ltd.) as a dispersant diluted 3 times in mass with ion-exchanged water.

(3) Install two oscillators with an oscillation frequency of 50 kHz with their phases shifted by 180 degrees, and put a predetermined amount of ion-exchanged water into the water tank of an ultrasonic disperser "Ultrasonic Dispersion System Tetora 150" (manufactured by Nikkaki Bios Co., Ltd.) having an electric output of 120 W. About 2 ml of Contaminon N described above is added to this water tank.

(4) Set the beaker of (2) in the beaker fixing hole of the ultrasonic disperser, and operate the ultrasonic disperser. Then, adjust the height position of the beaker so as to maximize the resonance state of the liquid level of the electrolytic aqueous solution in the beaker.

(5) With the electrolytic aqueous solution in the beaker of (4) being irradiated with ultrasonic waves, add about 10 mg of toner little by little to the electrolytic aqueous solution and disperse it. Then, continue the ultrasonic dispersion processing for another 60 seconds. Note that for ultrasonic dispersion, appropriately adjust the water temperature in the water tank at 10° C. or higher and 40° C. or lower.

(6) To the round bottom beaker of (1) installed in the sample stand, use a pipette to add dropwise the aqueous electrolyte solution of (5) having the toner dispersed therein, and adjust the measured concentration to about 5%. Then, perform measurement until the number of particles measured reaches 50000.

(7) Analyze the measurement data with the dedicated software attached to the apparatus to calculate the weight average particle diameter (D4) and the number average particle diameter (D1). Note that the "average diameter" of the analysis/volume statistical value (arithmetic mean) screen when the graph/volume % is set with the dedicated software is the weight average particle diameter (D4), and the "average diameter" of the analysis/number statistical value (arithmetic mean) screen when the graph/number % is set with the dedicated software is the number average particle diameter (D1).

<Method of Calculating Amount of Fine Powder>

The amount of fine powder (number %) based on the number in the toner is calculated as follows.

For example, as to the number % of particles having a size of 4.0 μm or less in the toner, measurement with Multisizer 3 described above is performed. After that, (1) set the graph/number % with the dedicated software and display the chart of the measurement results as the number %. (2) Check "<" in the particle diameter setting section on the format/particle diameter/particle diameter statistics screen, and enter "4" in the particle diameter input section below it. Then, (3) when the analysis/number statistical value (arithmetic mean) screen is displayed, the numerical value of the "<4 μm" display unit is the number % of the particles of 4.0 μm or less in the toner.

<Method of Calculating Amount of Coarse Powder>

The amount of coarse powder (volume %) based on the volume in the toner is calculated as follows.

For example, as to the volume % of particles having a size of 10.0 μm or more in the toner, measurement with Multisizer 3 described above is performed. After that, (1) set the graph/volume % with the dedicated software and display the chart of the measurement results as the volume %. (2) Check ">" in the particle diameter setting section on the format/particle diameter/particle diameter statistics screen, and enter "10" in the particle diameter input section below it. Then, (3) when the analysis/volume statistical value (arithmetic mean) screen is displayed, the numerical value of the ">10 μm" display unit is the volume % of the particles of 10.0 μm or more in the toner.

EXAMPLES

Different types of carrier core particles were prepared as shown below.

Production Example of Porous Magnetic Core Particles

Step 1 (Weighing and Mixing Step)

The ferrite raw materials were weighed as follows.

| | |
|---|---|
| $Fe_2O_3$ | 61.7% by mass |
| $MnCO_3$ | 34.2% by mass |
| $Mg(OH)_2$ | 3.0% by mass |
| $SrCO_3$ | 1.1% by mass |

Then, they were pulverized and mixed for 2 hours with a dry ball mill using a zirconia (φ10 mm) ball.

Step 2 (Temporary Calcination Step)

After pulverizing and mixing, the mixture was calcinated in the air at 950° C. for 2 hours using a burner type calcination furnace to prepare temporarily calcinated ferrite. The composition of the ferrite is as follows.

$$(MnO)_a(MgO)_b(SrO)_c(Fe_2O_3)_d$$

In the above formula, a=0.40, b=0.07, c=0.01, and d=0.52.

Step 3 (Pulverization Step)

After pulverizing to about 0.5 mm with a crusher, 30 parts by mass of water was added to 100 parts by mass of temporarily calcinated ferrite using a zirconia ball (φ10 mm), and the mixture was pulverized with a wet ball mill for 2 hours. After separating the balls, zirconia beads (φ1.0 mm) were used and pulverized with a wet bead mill for 3 hours to obtain a ferrite slurry.

Step 4 (Granulation Step)

To 100 parts by mass of temporarily calcinated ferrite, 2.0 parts by mass of polyvinyl alcohol was added as a binder to the ferrite slurry, and granulated into 40 μm spherical particles with a spray dryer (manufacturer: Ohkawara Kakohki Co., Ltd.).

Step 5 (Main Calcination Step)

In order to control the calcination atmosphere, it was calcinated in an electric furnace under a nitrogen atmosphere (oxygen concentration of 1.0% by volume) at 1150° C. for 4 hours.

Step 6 (Selection Step)

After crushing the aggregated particles, the coarse particles were removed by sieving with a sieve having an opening of 250 μm to obtain porous magnetic core particles. This is referred to as carrier core 1. Table 1 shows the physical properties of the obtained carrier core 1.

Step 7 (Resin Filling Step)

The carrier core 1 at 100.0 parts by mass was put in an agitation container of a mixing agitator (Universal agitator NDMV type manufactured by Dalton). Nitrogen was introduced while maintaining the temperature at 60° C. and reducing the pressure to 2.3 kPa. The silicone resin solution was added dropwise to the carrier core 1 as a resin component so as to be 7.5 parts by mass under reduced pressure, and agitation was continued for 2 hours after the completion of the addition. Then, the temperature was raised to 70° C., the solvent was removed under reduced pressure, and the particles of the carrier core 1 were filled with the silicone resin composition obtained from the silicone resin solution. After cooling, the obtained filled core particles were transferred to a mixer (drum mixer model UD-AT manufactured by Sugiyama Heavy Industrial, Co., Ltd.) having spiral blades in a rotatable mixing container, and heated to 220° C. at a heating rate of 2 (° C./min) under a nitrogen atmosphere and normal pressure. The resin was cured by heating and agitating at this temperature for 60 minutes. After heat treatment, low magnetic force products were separated by magnetic separation and classified with a sieve having an opening of 150 μm to obtain carrier core 2. Table 1 shows the physical properties of the obtained carrier core 2.

Production Example of Ferrite Core Particles

Step 1 (Weighing and Mixing Step)

The ferrite raw materials were weighed as follows.

| | |
|---|---|
| $Fe_2O_3$ | 61.7% by mass |
| $MnCO_3$ | 34.2% by mass |
| $Mg(OH)_2$ | 3.0% by mass |
| $SrCO_3$ | 1.1% by mass |

Then, they were pulverized and mixed for 2 hours with a dry ball mill using a zirconia (φ10 mm) ball.

Step 2 (Temporary Calcination Step)

After pulverizing and mixing, the mixture was calcinated in the air at 1000° C. for 2 hours using a burner type calcination furnace to prepare temporarily calcinated ferrite. The composition of the ferrite is as follows.

$$(MnO)_a(MgO)_b(SrO)_c(Fe_2O_3)_d$$

In the above formula, a=0.40, b=0.07, c=0.01, and d=0.52.

Step 3 (Pulverization Step)

After pulverizing to about 0.5 mm with a crusher, 30 parts by mass of water was added to 100 parts by mass of temporarily calcinated ferrite using a stainless ball (φ10 mm), and the mixture was pulverized with a wet ball mill for 2 hours. After separating the balls, stainless beads (φ1.0 mm) were used and pulverized with a wet bead mill for 3 hours to obtain a ferrite slurry.

Step 4 (Granulation Step)

To 100 parts by mass of temporarily calcinated ferrite, 2.0 parts by mass of polyvinyl alcohol was added as a binder to the ferrite slurry, and granulated into 45 μm spherical particles with a spray dryer (manufacturer: Ohkawara Kakohki Co., Ltd.).

Step 5 (Main Calcination Step)

In order to control the calcination atmosphere, it was calcinated in an electric furnace under a nitrogen atmosphere (oxygen concentration of 0.6% by volume) at 1200° C. for 6 hours.

Step 6 (Selection Step)

After crushing the aggregated particles, the coarse particles were removed by sieving with a sieve having an opening of 250 μm to obtain ferrite core particles. This is referred to as carrier core 3. Table 1 shows the physical properties of the obtained carrier core 3.

Production Example of Magnetic Material-Dispersed Resin Core Particles

Magnetite fine particles (spherical, number average particle diameter of 250 nm, specific resistance at 1000 V/cm of 3.3x106 Ω·cm) and a silane-based coupling agent (3-(2-aminoethylaminopropyl) trimethoxysilane in an amount of 3.0% by mass based on the mass of the magnetite fine particles) were introduced into a container. Then, the magnetite fine particles were surface-treated in the container by high-speed mixing and agitation at a temperature of 100° C. or higher.

Next, 84 parts by mass of the surface-treated magnetite fine particles, 10 parts by mass of phenol, and 16 parts by mass of a formaldehyde solution (37 mass % aqueous solution of formaldehyde) were introduced into a reaction vessel and mixed well at a temperature of 40° C.

Then, while agitating, the mixture was heated to a temperature of 85° C. at an average heating rate of 3° C./min, and 4 parts by mass of 28 mass % aqueous ammonia and 25 parts by mass of water were added to the reaction vessel, kept at a temperature of 85° C., and polymerized for 3 hours to cure. The peripheral speed of the agitation blades at this time was set to 1.8 (m/sec).

After the polymerization reaction, the mixture was cooled to a temperature of 30° C., and water was added. The precipitate obtained by removing the supernatant was washed with water and further air-dried. The obtained air-dried product was dried under reduced pressure (5 hPa or less) at a temperature of 60° C. to obtain magnetic material-dispersed resin core particles. This is referred to as carrier core 4. Table 1 shows the physical properties of the obtained carrier core 4.

TABLE 1

| Carrier Core | Volume-Based 50% Diameter (D50) (μm) | Apparent Density ($g/cm^3$) | True Density ($g/cm^3$) | Specific Resistance at Electric Field Strength of 1000 V/cm (Ω·cm) | Saturation Magnetization ($Am^2/kg$) |
|---|---|---|---|---|---|
| 1 | 38 | 2.25 | 4.88 | $4.0 \times 10^7$ | 62 |
| 2 | 40 | 1.85 | 3.95 | $4.4 \times 10^7$ | 60 |
| 3 | 46 | 2.35 | 4.90 | $3.6 \times 10^7$ | 69 |
| 4 | 35 | 1.90 | 3.53 | $7.3 \times 10^{10}$ | 71 |

Production Example of Resin A1

As shown in Table 2, 82.9% by mass of acrylic monomer having a halogen-substituted alkyl group corresponding to the first structural portion ($R^2$=$(CH_2)_2$—$(CF_2)_5$—$CF_3$) and 17.1% by mass of acrylic monomer corresponding to the second structural portion were added to a four-necked flask equipped with a reflux condenser, a thermometer, a nitrogen suction tube, and a grating-type agitator.

Further, 100 parts by mass of toluene, 100 parts by mass of methyl ethyl ketone, and 2.0 parts by mass of azobisisovaleronitrile were added. The obtained mixture was kept at 75° C. for 10 hours under a nitrogen stream, and after completion of the polymerization reaction, washing was repeated to obtain a resin A1 solution (solid content of 30% by mass). The value of m calculated by gel permeation chromatography (GPC) of this solution was 80.

Production Examples of Resins A2 to A22

Resins A2 to A22 were obtained in the same manner as in the production method of the resin A1 except that the first structural portion, the second structural portion, and the values of Ma, Mb, n, and m were changed as shown in Table 2.

TABLE 2

| Graft Resin A | First Partial Structure $R^1$ | $X^1$ | $R^2$ | F-Content Ratio (atom %) | Halogen Atom Ratio Other Than F (atom %) | Ma (% by Mass) | Second Partial Structure $R^3$ | $R^4$ | Mb (% by Mass) | (Ma + Mb)/X | Ma/Mb | m |
|---|---|---|---|---|---|---|---|---|---|---|---|---|
| Resin A1 | H | —COO— | $—(CH_2)_2—(CF_2)_5—CF_3$ | 76.5 | 0 | 82.9 | H | $—CH_3$ | 17.1 | 1.00 | 4.80 | 80 |
| Resin A2 | H | —COO— | $—(CH_2)_2—(CF_2)_5—CF_3$ | 76.5 | 0 | 82.9 | H | $—CH_3$ | 17.1 | 1.00 | 4.80 | 50 |
| Resin A3 | H | —COO— | $—(CH_2)_2—(CF_2)_5—CF_3$ | 76.5 | 0 | 82.9 | H | $—CH_3$ | 17.1 | 1.00 | 4.80 | 250 |
| Resin A4 | H | —COO— | $—(CH_2)_2—(CF_2)_5—CF_3$ | 76.5 | 0 | 82.9 | H | $—CH_3$ | 17.1 | 1.00 | 4.80 | 40 |
| Resin A5 | H | —COO— | $—(CH_2)_2—(CF_2)_5—CF_3$ | 76.5 | 0 | 82.9 | H | $—CH_3$ | 17.1 | 1.00 | 4.80 | 300 |
| Resin A6 | H | —COO— | 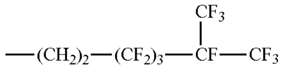 | 76.5 | 0 | 82.9 | H | $—CH_3$ | 17.1 | 1.00 | 4.80 | 40 |
| Resin A7 | H | —COO— | 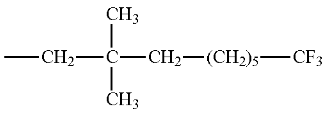 | 56.5 | 0 | 84.2 | H | $—CH_3$ | 15.8 | 1.00 | 5.30 | 40 |
| Resin A8 | H | —COO— | 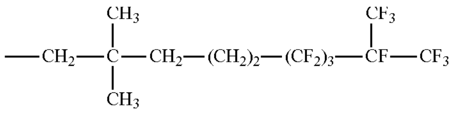 | 48.1 | 0 | 85.0 | H | $—CH_3$ | 15.0 | 1.00 | 5.70 | 40 |
| Resin A9 | $—CH_3$ | —O— | $—(CH_2)_2—(CF_2)_5—CF_3$ | 76.5 | 0 | 82.4 | H | $—CH_3$ | 17.6 | 1.00 | 4.70 | 40 |
| Resin A10 | H | —COO— | $—(CH_2)_2—(CF_2)_5—CF_3$ | 76.5 | 0 | 9.1 | H | $—CH_3$ | 90.9 | 1.00 | 0.10 | 40 |
| Resin A11 | H | —COO— | 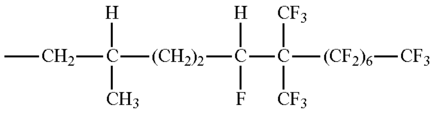 | 66.7 | 0 | 96.7 | H | $—CH_3$ | 3.3 | 1.00 | 29.3 | 40 |
| Resin A12 | H | —COO— | $—(CH_2)_2—(CF_2)_5—CF_3$ | 76.5 | 0 | 41.5 | H | $—CH_3$ | 8.5 | 0.50 | 4.90 | 40 |
| Resin A13 | H | —COO— | 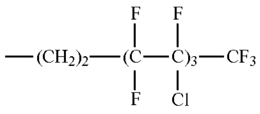 | 63.2 | 15.8 | 85.7 | H | $—CH_3$ | 14.3 | 1.00 | 6.00 | 40 |

TABLE 2-continued

| | First Partial Structure | | | | | | Second Partial Structure | | | | | |
|---|---|---|---|---|---|---|---|---|---|---|---|---|
| | | | | | Halogen Atom Ratio | | | | | | | |
| Graft Resin A | $R^1$ | $X^1$ | $R^2$ | F-Content Ratio (atom %) | Other Than F (atom %) | Ma (% by Mass) | $R^3$ | $R^4$ | Mb (% by Mass) | (Ma + Mb)/X | Ma/Mb | m |
| Resin A14 | H | —COO— | 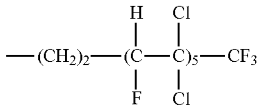 | 29.6 | 37.0 | 89.6 | H | $-CH_3$ | 10.4 | 1.00 | 8.60 | 40 |
| Resin A15 | H | —COO— | 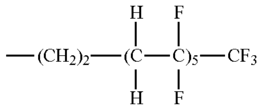 | 48.1 | 0 | 85.0 | H | $-CH_3$ | 15.0 | 1.00 | 5.70 | 40 |
| Resin A16 | H | —COO— | $-(CH_2)_{12}-CF_3$ | 11.1 | 0 | 78.2 | H | $-CH_3$ | 21.8 | 1.00 | 3.60 | 40 |
| Resin A17 | $-CH_3$ | —COO— | $-(CH_2)_2-(CF_2)_5-CF_3$ | 76.5 | 0 | 83.4 | H | $-CH_3$ | 16.6 | 1.00 | 5.00 | 40 |
| Resin A18 | H | —COO— | $-(CH_2)_2-(CF_2)_5-CF_3$ | 76.5 | 0 | 16.6 | H | $-CH_3$ | 3.4 | 0.20 | 4.80 | 40 |
| Resin A19 | H | —COO— | $-(CH_2)_2-(CF_2)_5-CF_3$ | 76.5 | 0 | 4.9 | H | $-CH_3$ | 95.1 | 1.00 | 0.05 | 40 |
| Resin A20 | H | —COO— | $-(CH_2)_2-(CF_2)_5-CF_3$ | 76.5 | 0 | 98.0 | H | $-CH_3$ | 2.0 | 1.00 | 49.0 | 40 |
| Resin A21 | H | —COO— | 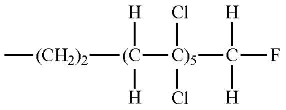 | 3.7 | 37.0 | 87.8 | H | $-CH_3$ | 12.2 | 1.00 | 7.20 | 40 |
| Resin A22 | H | —COO— | 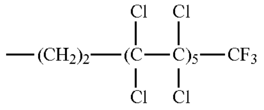 | 11.1 | 74.1 | 92.1 | H | $-CH_3$ | 7.9 | 1.00 | 1.40 | 40 |

<Method for Producing Macromonomer>

The macromonomer used in the resin B can be synthesized, for example, by the following method. The raw materials shown below were added to a four-necked flask equipped with a reflux condenser, a thermometer, a nitrogen suction tube, and a grating-type agitator.

Methacrylic acid chloride . . . 1.7% by mass

Methyl polymethacrylate having a hydroxyl group at one end (Mw: about 5000) . . . 98.3% by mass Further, 100 parts by mass of THF and 1.0 part by mass of 4-tert-butylcatechol were added, and the mixture was heated under reflux for 5 hours under a nitrogen stream, and after completion of the reaction, it was washed with sodium hydrogencarbonate to obtain a solution of macromonomer.

<Method of Producing Resin B1>

Cyclohexyl methacrylate as the monomer of the third partial structure as well as methyl methacrylate and the above macromonomer as the monomers of the fourth partial structure were added in the following mass % to a four-necked flask equipped with a reflux condenser, a thermometer, a nitrogen suction tube, and a grating-type agitator.

Cyclohexyl methacrylate . . . 74.5% by mass

Methyl methacrylate . . . 0.5% by mass

Methacrylic acid macromonomer . . . 25.0% by mass

Further, 100 parts by mass of toluene, 100 parts by mass of methyl ethyl ketone, and 2.0 parts by mass of azobisisovaleronitrile were added. The obtained mixture was kept at 70° C. for 10 hours under a nitrogen stream, and after completion of the polymerization reaction, washing was repeated to obtain a resin B1 solution (solid content of 35% by mass).

<Method of Producing Resin B2>

Cyclohexyl methacrylate as the monomer of the third partial structure as well as methyl methacrylate and the above macromonomer as the monomers of the fourth partial structure were added in the following mass % to a four-necked flask equipped with a reflux condenser, a thermometer, a nitrogen suction tube, and a grating-type agitator.

| | |
|---|---|
| Cyclohexyl methacrylate | 55.0% by mass |
| Methyl methacrylate | 0.5% by mass |
| Methacrylic acid macromonomer | 44.5% by mass |

Further, 100 parts by mass of toluene, 100 parts by mass of methyl ethyl ketone, and 2.0 parts by mass of azobisisovaleronitrile were added. The obtained mixture was kept at 70° C. for 10 hours under a nitrogen stream, and after completion of the polymerization reaction, washing was repeated to obtain a resin B2 solution (solid content of 35% by mass).

<Method of Producing Resin B3>

Cyclohexyl methacrylate as the monomer of the third partial structure as well as methyl methacrylate and the above macromonomer as the monomers of the fourth partial structure were added in the following mass % to a four-necked flask equipped with a reflux condenser, a thermometer, a nitrogen suction tube, and a grating-type agitator.

| | |
|---|---|
| Cyclohexyl methacrylate | 25.0% by mass |
| Methyl methacrylate | 0.5% by mass |
| Methacrylic acid macromonomer | 74.5% by mass |

Further, 100 parts by mass of toluene, 100 parts by mass of methyl ethyl ketone, and 2.0 parts by mass of arobisisovaleronitrile were added. The obtained mixture was kept at 70° C. for 10 hours under a nitrogen stream, and after completion of the polymerization reaction, washing was repeated to obtain a resin B3 solution (solid content of 35% by mass).

<Method of Producing Resin B4>

Cyclohexyl methacrylate as the monomer of the third partial structure as well as methyl methacrylate as the monomers of the fourth partial structure were added in the following mass % to a four-necked flask equipped with a reflux condenser, a thermometer, a nitrogen suction tube, and a grating-type agitator.

| | |
|---|---|
| Cyclohexyl methacrylate | 80.0% by mass |
| Methyl methacrylate | 20.0% by mass |

Further, 100 parts by mass of toluene, 100 parts by mass of methyl ethyl ketone, and 2.0 parts by mass of azobisisovaleronitrile were added. The obtained mixture was kept at 70° C. for 10 hours under a nitrogen stream, and after completion of the polymerization reaction, washing was repeated to obtain a resin B4 solution (solid content of 35% by mass).

<Method of Producing Resin B5>

Cyclohexyl methacrylate as the monomer of the third partial structure as well as methyl methacrylate as the monomers of the fourth partial structure were added in the following mass % to a four-necked flask equipped with a reflux condenser, a thermometer, a nitrogen suction tube, and a grating-type agitator.

| | |
|---|---|
| Cyclohexyl methacrylate | 5.0% by mass |
| Methyl methacrylate | 95.0% by mass |

Further, 100 parts by mass of toluene, 100 parts by mass of methyl ethyl ketone, and 2.0 parts by mass of azobisisovaleronitrile were added. The obtained mixture was kept at 70° C. for 10 hours under a nitrogen stream, and after completion of the polymerization reaction, washing was repeated to obtain a resin B5 solution (solid content of 35% by mass).

<Method of Producing Resin B6>

Cyclohexyl methacrylate as the monomer of the third partial structure as well as methyl methacrylate as the monomers of the fourth partial structure were added in the following mass % to a four-necked flask equipped with a reflux condenser, a thermometer, a nitrogen suction tube, and a grating-type agitator.

| | |
|---|---|
| Cyclohexyl methacrylate | 85.0% by mass |
| Methyl methacrylate | 15.0% by mass |

Further, 100 parts by mass of toluene, 100 parts by mass of methyl ethyl ketone, and 2.0 parts by mass of azobisisovaleronitrile were added. The obtained mixture was kept at 70° C. for 10 hours under a nitrogen stream, and after completion of the polymerization reaction, washing was repeated to obtain a resin B6 solution (solid content of 35% by mass).

<Method of Producing Resin B7>

Cyclohexyl methacrylate as the monomer of the third partial structure as well as methyl methacrylate as the monomers of the fourth partial structure were added in the following mass % to a four-necked flask equipped with a reflux condenser, a thermometer, a nitrogen suction tube, and a grating-type agitator.

| | |
|---|---|
| Cyclohexyl methacrylate | 3.0% by mass |
| Methyl methacrylate | 97.0% by mass |

Further, 100 parts by mass of toluene, 100 parts by mass of methyl ethyl ketone, and 2.0 parts by mass of azobisisovaleronitrile were added. The obtained mixture was kept at 70° C. for 10 hours under a nitrogen stream, and after completion of the polymerization reaction, washing was repeated to obtain a resin B7 solution (solid content of 35% by mass).

<Method of Producing Resin B8>

The monomers shown below and the above macromonomer were added to a four-necked flask equipped with a reflux condenser, a thermometer, a nitrogen suction tube, and a grating-type agitator.

| | |
|---|---|
| Methyl methacrylate | 75.0% by mass |
| Methacrylic acid macromonomer | 25.0% by mass |

Further, 100 parts by mass of toluene, 100 parts by mass of methyl ethyl ketone, and 2.0 parts by mass of azobisisovaleronitrile were added. The obtained mixture was kept at 70° C. for 10 hours under a nitrogen stream, and after completion of the polymerization reaction, washing was repeated to obtain a resin B8 solution (solid content of 35% by mass).

<Method of Preparing Magnetic Carrier 1>

As shown in Table 3, the carrier core 2 was put in a planetary motion type mixer (Nauta mixer model VN manufactured by Hosokawa Micron Corporation) maintained at a temperature of 60° C. under reduced pressure (1.5 kPa), and a resin solution containing resin A1 at 5% by mass and resin B1 at 95% by mass shown in Table 3 was added to 100 parts by mass of the carrier core so as to be 2.0 parts by mass as the solid content of the resin component. As a method of charging, ⅓ of the amount of the resin solution was charged, and solvent removal and coating operation were performed for 20 minutes. Next, a further ⅓ of the amount of the resin solution was added, and solvent removal and coating operation were performed for 20 minutes. Lastly, a further ⅓ of the amount of the resin solution was added, and solvent removal and coating operation were performed for 20 minutes.

Then, the magnetic carrier coated with the coated resin composition was transferred to a mixer (drum mixer model UD-AT manufactured by Sugiyama Heavy Industrial, Co., Ltd.) having spiral blades in a rotatable mixing container, and the mixing container was rotated 10 times per minute for agitation and heat-treated at a temperature of 120° C. for 2 hours under a nitrogen atmosphere. The obtained magnetic carrier 1 was subjected to magnetic separation to separate low magnetic force products, passed through a sieve having an opening of 150 μm, and then classified by a wind power classifier. A magnetic carrier 1 having a 50% particle diameter (D50) of 39.1 μm based on the volume distribution was obtained. Table 3 shows the physical properties (SPa1 and SPb3) of the obtained magnetic carrier 1.

<Method for Producing Magnetic Carriers 2 to 39>

In the same manner as in the method of producing the above magnetic carrier 1, the carrier core to be used and the resin solution composed of the resin A and the resin B were changed as shown in Table 3 to obtain magnetic carriers 2 to 39. Table 3 shows the physical properties of the obtained magnetic carriers 2 to 39.

TABLE 3

| | | Resin A | | | Resin B | | | | Coating |
|---|---|---|---|---|---|---|---|---|---|
| Magnetic Carrier No. | Carrier Core No. | Resin Type | Mass % | Spa1 | Resin Type | Mass % | Spb3 | Δ\|Spa1-Spb3\| | Layer Film Thickness |
| Magnetic Carrier 1 | 2 | A1 | 5 | 7.66 | B1 | 95 | 10.58 | 2.92 | 700 |
| Magnetic Carrier 2 | 2 | A1 | 5 | 7.66 | B1 | 95 | 10.58 | 2.92 | 50 |
| Magnetic Carrier 3 | 2 | A1 | 5 | 7.66 | B1 | 95 | 10.58 | 2.92 | 3000 |
| Magnetic Carrier 4 | 7 | A1 | 5 | 7.66 | B1 | 95 | 10.58 | 2.92 | 40 |
| Magnetic Carrier 5 | 7 | A1 | 5 | 7.66 | B1 | 95 | 10.58 | 2.92 | 3200 |
| Magnetic Carrier 6 | 7 | A1 | 5 | 7.66 | B2 | 95 | 10.58 | 2.92 | 3200 |
| Magnetic Carrier 7 | 2 | A1 | 5 | 7.66 | B3 | 95 | 10.58 | 2.92 | 3200 |
| Magnetic Carrier 8 | 2 | A1 | 5 | 7.66 | B4 | 95 | 10.58 | 2.92 | 3200 |
| Magnetic Carrier 9 | 2 | A1 | 5 | 7.66 | B5 | 95 | 10.58 | 2.92 | 3200 |
| Magnetic Carrier 10 | 2 | A1 | 5 | 7.66 | B6 | 95 | 10.58 | 2.92 | 3200 |
| Magnetic Carrier 11 | 2 | A1 | 5 | 7.66 | B7 | 95 | 10.58 | 2.92 | 3200 |
| Magnetic Carrier 12 | 2 | A2 | 5 | 7.66 | B6 | 95 | 10.58 | 2.92 | 3200 |
| Magnetic Carrier 13 | 2 | A3 | 5 | 7.66 | B6 | 95 | 10.58 | 2.92 | 3200 |
| Magnetic Carrier 14 | 2 | A4 | 5 | 7.66 | B6 | 95 | 10.58 | 2.92 | 3200 |
| Magnetic Carrier 15 | 2 | A5 | 5 | 7.66 | B6 | 95 | 10.58 | 2.92 | 3200 |
| Magnetic Carrier 16 | 2 | A6 | 5 | 7.46 | B6 | 95 | 10.58 | 3.12 | 3200 |
| Magnetic Carrier 17 | 2 | A7 | 5 | 7.62 | B6 | 95 | 10.58 | 2.96 | 3200 |
| Magnetic Carrier 18 | 2 | A8 | 5 | 7.43 | B6 | 95 | 10.58 | 3.15 | 3200 |
| Magnetic Carrier 19 | 2 | A9 | 5 | 8.59 | B6 | 95 | 10.58 | 1.91 | 3200 |
| Magnetic Carrier 20 | 2 | A10 | 5 | 7.66 | B6 | 95 | 10.58 | 2.92 | 3200 |
| Magnetic Carrier 21 | 2 | A11 | 5 | 7.3 | B6 | 95 | 10.58 | 3.28 | 3200 |
| Magnetic Carrier 22 | 2 | A12 | 5 | 7.66 | B6 | 95 | 10.58 | 2.92 | 3200 |
| Magnetic Carrier 23 | 2 | A1 | 2 | 7.66 | B6 | 98 | 10.58 | 2.92 | 3200 |
| Magnetic Carrier 24 | 2 | A1 | 45 | 7.66 | B6 | 55 | 10.58 | 2.92 | 3200 |
| Magnetic Carrier 25 | 2 | A1 | 1 | 7.66 | B6 | 99 | 10.58 | 2.92 | 3200 |
| Magnetic Carrier 26 | 2 | A1 | 50 | 7.66 | B6 | 50 | 10.58 | 2.92 | 3200 |
| Magnetic Carrier 27 | 3 | A13 | 5 | 8.61 | B6 | 95 | 10.58 | 1.96 | 3200 |
| Magnetic Carrier 28 | 3 | A14 | 5 | 9.33 | B6 | 95 | 10.58 | 1.25 | 3200 |
| Magnetic Carrier 29 | 4 | A15 | 5 | 8.75 | B6 | 95 | 10.58 | 1.82 | 3200 |
| Magnetic Carrier 30 | 4 | A16 | 5 | 8.35 | B6 | 95 | 10.58 | 2.22 | 3200 |

TABLE 3-continued

| Magnetic Carrier No. | Carrier Core No. | Resin A Resin Type | Resin A Mass % | Resin A Spa1 | Resin B Resin Type | Resin B Mass % | Resin B Spb3 | Δ\|Spa1-Spb3\| | Coating Layer Film Thickness |
|---|---|---|---|---|---|---|---|---|---|
| Magnetic Carrier 31 | 1 | A17 | 5 | 7.26 | B6 | 95 | 10.58 | 3.32 | 3200 |
| Magnetic Carrier 32 | 2 | — | 0 | — | B1 | 100 | 10.58 | — | 3200 |
| Magnetic Carrier 33 | 2 | A1 | 100 | 7.66 | B6 | 0 | — | — | 3200 |
| Magnetic Carrier 34 | 2 | A18 | 5 | 7.66 | B6 | 95 | 10.58 | 2.92 | 3200 |
| Magnetic Carrier 35 | 2 | A19 | 5 | 7.66 | B6 | 95 | 10.58 | 2.92 | 3200 |
| Magnetic Carrier 36 | 2 | A20 | 5 | 7.66 | B6 | 95 | 10.58 | 2.92 | 3200 |
| Magnetic Carrier 37 | 2 | A1 | 5 | 7.66 | B8 | 95 | 9.93 | 2.27 | 3200 |
| Magnetic Carrier 38 | 2 | A21 | 5 | 9.33 | B6 | 95 | 10.58 | 1.24 | 3200 |
| Magnetic Carrier 39 | 2 | A22 | 5 | 9.07 | B6 | 95 | 10.58 | 1.5 | 3200 |

Production Example of Toner 1

The following materials

| | |
|---|---|
| Polyester resin | 100 parts by mass |
| Fischer-Tropsch wax (peak temperature of maximum endothermic peak 90° C.) | 4 parts by mass |
| Compound aluminum 3,5-di-t-butylsalicylate (Bontron E88, manufactured by Orient Chemical Industries Co., Ltd) | 0.3 parts by mass |
| Carbon black | 10 parts by mass |

were mixed using a Henschel mixer (FM-75 type, manufactured by Mitsui Kozan Co., Ltd.) at a rotation speed of 1500 rpm and a rotation time of 5 min, and then kneaded with a twin-screw kneader (model PCM-30, manufactured by Ikegai Corp.) set at a temperature of 130° C. The obtained kneaded product was cooled and coarsely pulverized with a hammer mill to 1 mm or less to obtain a coarsely crushed product. The obtained coarsely pulverized product was finely pulverized with a mechanical pulverizer (T-250, manufactured by Freund Turbo). Further, Faculty (F-300, manufactured by Hosokawa Micron Corporation) was used to perform classification to obtain toner mother particles 1. The operating conditions were a classification rotor rotation speed of 11000 rpm and a distribution rotor rotation speed of 7200 rpm.

Silica fine particles A were added to the obtained toner mother particles 1 at the following ratios to prepare raw materials.

| | |
|---|---|
| Toner mother particles 1 | 100 parts by mass |
| Silica fine particles A (number average particle diameter (D1) of 120 nm) | 2.0 parts by mass |

Figure 3:
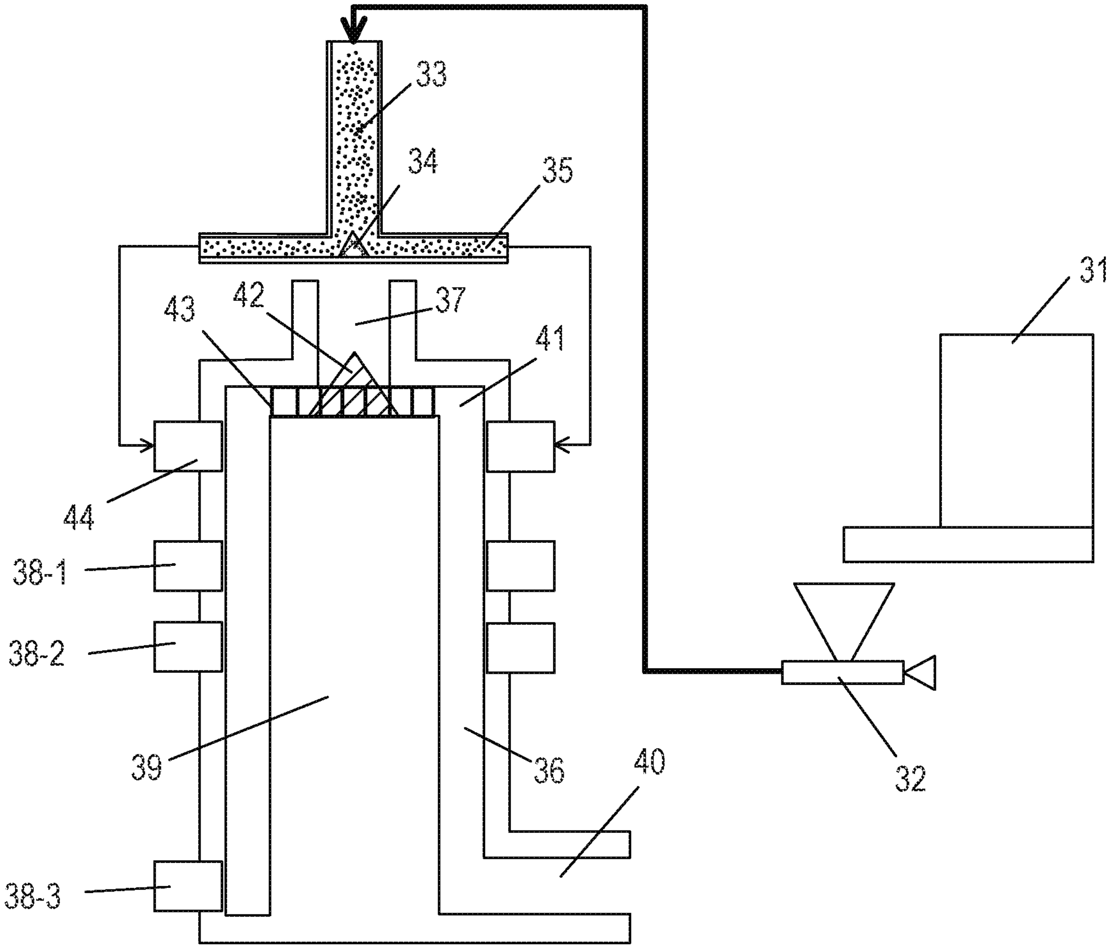
FIG. 3 is a schematic diagram of a surface treatment apparatus suitable for surface treatment of toner according to the developer of the present disclosure.

The above raw materials were mixed using a Henschel mixer (model FM-10C, manufactured by Mitsui Kozan Co., Ltd.) at a rotation speed of 1900 rpm and a rotation time of 3 min, and then heat-treated with the surface treatment apparatus shown in FIG. 3 to obtain heat treatment toner particles 1. The operating conditions were such that feed rate=5 kg/hr, hot air temperature C=160° C. hot air flow rate=6 $m^3$/min., cold air temperature=−5° C., cold air flow rate=4 $m^3$/min., blower air flow rate=20 $m^3$/min., and injection air flow rate=1 $m^3$/min.

The obtained heat treatment toner particles 1 were prepared using an inertial classification type Elbow-Jet (manufactured by Nittetsu Mining Co., Ltd.), and silica fine particles B were added in the following proportions to prepare a material.

| | |
|---|---|
| Heat treatment toner particles 1 | 100 parts by mass |
| Silica fine particles B (number average particle diameter (D1) of 20 nm) | 0.6 parts by mass |

The above materials were mixed with a Henschel mixer (model FM-75, manufactured by Mitsui Mitsuike Koki Co., Ltd.) at a rotation speed of 1900 rpm and a rotation time of 3 min to obtain toner 1.

The toner 1 had a weight average particle diameter (D4) of 6.6 μm, an average circularity of 0.965, a fine powder amount of 25% by number, and a coarse powder amount of 3% by volume.

Example 1

To 91 parts by mass of the magnetic carrier 1, 9 parts by mass of the toner 1 was added and shaken with a shaker (Model YS-8D: manufactured by Yayoi Co., Ltd.) to prepare 300 g of two-component developer 1. The amplitude condition of the shaker was 150 rpm for 2 minutes.

On the other hand, to 10 parts by mass of the magnetic carrier 1, 90 parts by mass of the toner 1 was added and mixed in an environment of room temperature and room humidity of 23° C./50% RH for 5 minutes with a V-type mixer to obtain a replenishing developer 1.

The following evaluation was performed using the two-component developer 1 and the replenishing developer 1. Table 5 shows the evaluation results.

[Roughness Evaluation]

The releasing of the coating resin layer was evaluated by the roughness as follows.

As an image forming apparatus, an imagePRESS C800 (manufactured by Canon) modified machine was used, a two-component developer 1 was put in a developing device at a cyan position, and a replenishing developer container containing a replenishing developer 1 was set (the same applies to the following evaluations). What was modified was that the fixing temperature, process speed, direct current voltage VDC of the developer support, charging voltage VD of the electrostatic latent image bearing member, laser power, and total discharge current flow rate of the charging device could be freely set. In the image output evaluation, an FFH image (solid image) having a desired image ratio was outputted, and the VDC, VD, and laser power were adjusted so that the amount of toner on the FFH image was as desired, and the evaluation described later was performed. FFH is a value in which 256 gradations are displayed in hexadecimal, where 00 h is the first gradation (white background portion) of 256 gradations, and FFH is the 256th gradation (solid portion) of 256 gradations.

In a room temperature and room humidity environment with a temperature of 30° C. and a humidity of 80% RH, the process speed was set to 357 mm/s and the total discharge current flow rate of the charging device was set to 100 μA. On an A4 paper of CS-680 (68.0 g/$m^2$) (sold by Canon Marketing Japan Inc.), in the image (FFH image) of 1 dot 2 space horizontal ruled lines, the amount of toner loaded on the paper was adjusted to 0.35 mg/$cm^2$ by the direct current voltage VDC of the developer support, the charging voltage VD of the electrostatic latent image bearing member, and the laser power.

Then, as a stabilization and durability evaluation of the evaluation machine, 20000 A4 paper sheets were outputted using a band chart having an image ratio of 0.1%, and then one halftone image (30H) was printed on one A4 sheet. As to the image, an area of 1000 dots was measured using a digital microscope VHX-500 (Wide-Range Zoom Lens VH-Z100 manufactured by Keyence Corporation). The number average (S) of the dot area and the standard deviation (a) of the dot area were calculated, and the dot reproducibility index was calculated with the following formula. Then, the roughness of the halftone image was used as the dot reproducibility index (I), and the difference from the initial stage was compared.

$$\text{Dot reproducibility index}(I)=\sigma/S\times 100$$

As the evaluation criteria for roughness, cyan was used as a single color, and the evaluation was performed according to the following criteria. In addition, it was judged that the effect of the present disclosure was obtained at rank C or higher.

A: The difference from the initial stage is less than 2.0
B: The difference from the initial stage is 2.0 or more and less than 4.0
C: The difference from the initial stage is 4.0 or more and less than 6.0
D: The difference from the initial stage is 6.0 or more and less than 8.0
E: The difference from the initial stage is 8.0 or more and less than 10.0
F: Difference from the initial stage is 10.0 or more

[Evaluation of Charge Amount During Durability]

Carrier contamination was evaluated with the following changes in charge amount during durability.

In a room temperature and room humidity environment with a temperature of 30° C. and a humidity of 80% RH, the process speed was set to 357 mm/s and the total discharge current flow rate of the charging device was set to 100 ρA. On an A4 paper of CS-680 (68.0 g/$m^2$) (sold by Canon Marketing Japan Inc.), in the image (FFH image) of 1 dot 2 space horizontal ruled lines, the amount of toner loaded on the paper was adjusted to 0.35 mg/$cm^2$ by the direct current voltage VDC of the developer support, the charging voltage VD of the electrostatic latent image bearing member, and the laser power. With the above modification, a band chart with an image ratio of 40% was used to output 20000 A4 paper sheets. Before the output, an image with a toner loading amount of 0.35 g/$cm^2$ was outputted, and the apparatus was stopped when the toner was loaded on the photoconductor. Then, the photoconductor was taken out of the apparatus, and the charge amount Q/M (mC/kg) per unit mass of the toner on the photoconductor was measured and used as an initial value.

Then, after outputting 20000 sheets, the charge amount Q/M per unit mass of the toner on the photoconductor was measured in the same manner. Then, when the initial value Q/M was set to 100%, the maintenance rate of Q/M of the toner on the photoconductor after 20000 sheets was outputted was calculated and judged according to the following criteria.

In addition, it was judged that the effect of the present disclosure was obtained at rank C or higher.

A: The maintenance rate is 90% or more.
B: The maintenance rate is 85% or more and less than 90%.
C: The maintenance rate is 80% or more and less than 85%.
D: The maintenance rate is 75% or more and less than 80%.
E: The maintenance rate is 70% or more and less than 75%.
F: The maintenance rate is 60% or more and less than 70%.
G: The maintenance rate is less than 60%.

[Fog Evaluation]

After performing the initial durability and durability image output evaluation (A4 landscape, 40% print ratio, 50000 sheets) in a high temperature and high humidity environment (30° C., 80% RH), an A4 full-face solid white image was outputted. For fog, the whiteness of the white background was measured with a reflectometer (manufactured by Tokyo Denshoku Co., Ltd.), the fog concentration (%) was calculated from the difference in whiteness before and after transfer, and evaluation was performed according to the following criteria. In addition, it was judged that the effect of the present disclosure was obtained at rank C or higher.

A: Less than 1.0%
B: 1.0% or more and less than 1.5%
C: 1.5% or more and less than 2.0%
D: 2.0% or more and less than 2.5%
E: 2.5% or more

[Tonality Evaluation]

At the initial stage of durability under a high temperature and high humidity environment (30° C., 80% RH), an image was outputted with each pattern set to the density shown below. Then, after performing the durability image output evaluation (A4 landscape, 40% print ratio, 20000 sheets), the same image was outputted, and the difference in tonality between the initial stage and immediately after the 20000 sheet durability test was confirmed. The image was judged by measuring each image density with an X-Rite color reflection densitometer (Color reflection densitometer X-Rite 404A). The evaluation was performed with a single cyan color.

Pattern 1: 0.10 to 0.13
Pattern 2: 0.25 to 0.28
Pattern 3: 0.40 to 0.43
Pattern 4: 0.55 to 0.58
Pattern 5: 0.70 to 0.73
Pattern 6: 0.85 to 0.88
Pattern 7: 1.00 to 1.03
Pattern 8: 1.15 to 1.18
Pattern 9: 1.30 to 1.33
Pattern 10: 1.45 to 1.48

The judgment criteria are as follows. In addition, it was judged that the effect of the present disclosure was obtained at rank C or higher.

A: All pattern images satisfy the above density range.
B: One pattern image is out of the above density range.
C: Two pattern images are out of the above density range.
D: Three pattern images are out of the above density range.
E: Four pattern images are out of the above density range.

F: Five pattern images are out of the above density range.
G: Six pattern images are out of the above density range.
H: Seven pattern images are out of the above density range.
I: Eight pattern images are out of the above density range.
J: Nine or more pattern images are out of the above density range.

Examples 2 to 31

In Examples 2 to 31, similarly to Example 1, a two-component developer and a replenishing developer were prepared by combining the magnetic carrier and the toner shown in Table 4, and the same evaluation as in Example 1 was performed. Table 5 shows the evaluation results.

Comparative Examples 1 to 8

In Comparative Examples 1 to 8, similarly to Example 1, a two-component developer and a replenishing developer were prepared by combining the magnetic carrier and the toner shown in Table 4, and the same evaluation as in Example 1 was performed. Table 5 shows the evaluation results.

TABLE 4

| Example or Comparative Example | Magnetic Carrier No. | Toner | Two-Component Developer | Replenishing Developer |
|---|---|---|---|---|
| Example 1 | Magnetic Carrier 1 | 1 | 1 | 1 |
| Example 2 | Magnetic Carrier 2 | 1 | 2 | 2 |
| Example 3 | Magnetic Carrier 3 | 1 | 3 | 3 |
| Example 4 | Magnetic Carrier 4 | 1 | 4 | 4 |
| Example 5 | Magnetic Carrier 5 | 1 | 5 | 5 |
| Example 6 | Magnetic Carrier 6 | 1 | 6 | 6 |
| Example 7 | Magnetic Carrier 7 | 1 | 7 | 7 |
| Example 8 | Magnetic Carrier 8 | 1 | 8 | 8 |
| Example 9 | Magnetic Carrier 9 | 1 | 9 | 9 |
| Example 10 | Magnetic Carrier 10 | 1 | 10 | 10 |
| Example 11 | Magnetic Carrier 11 | 1 | 11 | 11 |
| Example 12 | Magnetic Carrier 12 | 1 | 12 | 12 |
| Example 13 | Magnetic Carrier 13 | 1 | 13 | 13 |
| Example 14 | Magnetic Carrier 14 | 1 | 14 | 14 |
| Example 15 | Magnetic Carrier 15 | 1 | 15 | 15 |
| Example 16 | Magnetic Carrier 16 | 1 | 16 | 16 |
| Example 17 | Magnetic Carrier 17 | 1 | 17 | 17 |
| Example 18 | Magnetic Carrier 18 | 1 | 18 | 18 |
| Example 19 | Magnetic Carrier 19 | 1 | 19 | 19 |
| Example 20 | Magnetic Carrier 20 | 1 | 20 | 20 |
| Example 21 | Magnetic Carrier 21 | 1 | 21 | 21 |
| Example 22 | Magnetic Carrier 22 | 1 | 22 | 22 |

TABLE 4-continued

| Example or Comparative Example | Magnetic Carrier No. | Toner | Two-Component Developer | Replenishing Developer |
|---|---|---|---|---|
| Example 23 | Magnetic Carrier 23 | 1 | 23 | 23 |
| Example 24 | Magnetic Carrier 24 | 1 | 24 | 24 |
| Example 25 | Magnetic Carrier 25 | 1 | 25 | 25 |
| Example 26 | Magnetic Carrier 26 | 1 | 26 | 26 |
| Example 27 | Magnetic Carrier 27 | 1 | 27 | 27 |
| Example 28 | Magnetic Carrier 28 | 1 | 28 | 28 |
| Example 29 | Magnetic Carrier 29 | 1 | 29 | 29 |
| Example 30 | Magnetic Carrier 30 | 1 | 30 | 30 |
| Example 31 | Magnetic Carrier 31 | 1 | 31 | 31 |
| Comparative Example 1 | Magnetic Carrier 32 | 1 | 32 | 32 |
| Comparative Example 2 | Magnetic Carrier 33 | 1 | 33 | 33 |
| Comparative Example 3 | Magnetic Carrier 34 | 1 | 34 | 34 |
| Comparative Example 4 | Magnetic Carrier 35 | 1 | 35 | 35 |
| Comparative Example 5 | Magnetic Carrier 36 | 1 | 36 | 36 |
| Comparative Example 6 | Magnetic Carrier 37 | 1 | 37 | 37 |
| Comparative Example 7 | Magnetic Carrier 38 | 1 | 38 | 38 |
| Comparative Example 8 | Magnetic Carrier 39 | 1 | 39 | 39 |

TABLE 5

| Example Comparative Example | Roughness Evaluation | Evaluation of Charge Amount During Durability | Fog Evaluation | Tonality Evaluation |
|---|---|---|---|---|
| Example 1 | A | A | A | A |
| Example 2 | A | A | A | A |
| Example 3 | A | A | A | A |
| Example 4 | A | A | B | A |
| Example 5 | A | A | A | B |
| Example 6 | A | A | B | B |
| Example 7 | A | A | B | B |
| Example 8 | A | A | B | B |
| Example 9 | B | A | B | B |
| Example 10 | A | A | B | B |
| Example 11 | B | A | C | B |
| Example 12 | A | A | B | B |
| Example 13 | A | A | B | B |
| Example 14 | A | A | C | B |
| Example 15 | A | B | B | B |
| Example 16 | A | A | C | B |
| Example 17 | A | A | C | B |
| Example 18 | A | A | C | B |
| Example 19 | A | A | C | B |
| Example 20 | A | B | C | B |
| Example 21 | A | B | C | B |
| Example 22 | A | C | C | B |
| Example 23 | A | B | C | B |
| Example 24 | B | A | C | B |
| Example 25 | A | C | C | B |
| Example 26 | C | A | C | B |
| Example 27 | A | B | C | B |
| Example 28 | A | C | C | B |
| Example 29 | A | A | C | B |
| Example 30 | A | C | C | B |

TABLE 5-continued

| Example Comparative Example | Roughness Evaluation | Evaluation of Charge Amount During Durability | Fog Evaluation | Tonality Evaluation |
|---|---|---|---|---|
| Example 31 | A | A | C | B |
| Comparative Example 1 | A | D | A | B |
| Comparative Example 2 | D | A | D | B |
| Comparative Example 3 | A | D | C | B |
| Comparative Example 4 | D | D | C | B |
| Comparative Example 5 | D | A | D | B |
| Comparative Example 6 | D | C | C | B |
| Comparative Example 7 | A | D | C | B |
| Comparative Example 8 | A | D | C | B |

As described above, the present disclosure makes it possible to provide a carrier that achieves reduced fogging, stable image density, and developability even after long-term use.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-020450, filed Feb. 12, 2021, and Japanese Patent Application No. 2021-208923, filed Dec. 23, 2021, which are hereby incorporated by reference herein in their entirety.

What is claimed is:

1. A magnetic carrier comprising:

a magnetic carrier core; and a coating resin layer coating a surface of the magnetic carrier core, wherein the coating resin layer contains resin A and resin B, a content of the resin A is 1% by mass or more and 50% by mass or less based on mass of resin components contained in the coating resin layer, a content of the resin B is 50% by mass or more and 99% by mass or less based on mass of resin components contained in the coating resin layer, the resin A has a first partial structure represented by formula (1) and a second partial structure represented by formula (2), the resin B has a third partial structure represented by formula (3) and a fourth partial structure represented by formula (4), when a mass of the resin A is represented by X, a total mass of the first partial structure in the resin A is represented by Ma, and a total mass of the second partial structure in the resin A is represented by Mb, X, Ma and Mb satisfy $$0.50 \leq (Ma+Mb)/X \leq 1.00$$

$$0.10 \leq Ma/Mb \leq 30.0, \text{ and}$$

when an SP value of the first partial structure of the resin A is represented by SPa1, and an SP value of the third partial structure of the resin B is represented by SPb3, SPa1 and SPb3 satisfy $$0 \leq |SPa1-SPb3| \leq 10.0,$$

Formula (1)

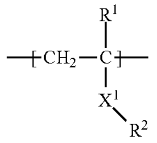

wherein in formula (1), $R^1$ represents a hydrogen or methyl group, $X^1$ represents —COO— or —O—, $R^2$ represents an alkyl group having 1 to 20 carbon atoms, the alkyl group is a halogen-substituted alkyl group in which at least a part of hydrogen atoms is substituted with a fluorine atom, and a part of remaining hydrogen atoms may be substituted with a halogen atom other than a fluorine atom, and based on a total number of hydrogen atoms, fluorine atoms, and halogen atoms other than fluorine atoms contained in the halogen-substituted alkyl group, a proportion of the fluorine atoms is 5.0 atom % or more, and a proportion of the halogen atoms other than fluorine atoms is 40.0 atom % or less, Formula (2)

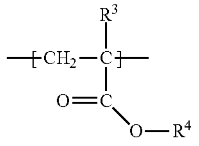

$R^3$ represents a hydrogen or methyl group, $R^4$ represents a hydrocarbon group having 1 to 12 carbon atoms, Formula (3)

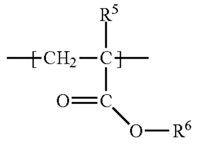

represents a hydrogen or methyl group, $R^6$ represents a hydrocarbon group having 3 to 10 carbon atoms containing an alicyclic structure, Formula (4)

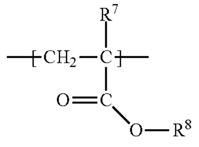

$R^7$ represents a hydrogen or methyl group, and $R^8$ represents a chain hydrocarbon group having 1 to 12 carbon atoms, and when an average value of a total number of the first partial structure and the second partial structure in molecular chains constituting the resin A is represented by m, the m satisfies the following formula $$50 \leq m \leq 250.$$

2. The magnetic carrier according to claim 1, wherein the first partial structure of the resin A represented by formula (1) has a structure represented by formula (1-3)

Formula (1-3)

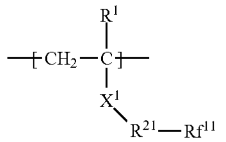

wherein in formula (1-3), $R^1$ represents a hydrogen or methyl group, $X^1$ represents —COO— or —O—, $R^{21}$ represents a single bond or an alkylene group, and $Rf^{11}$ represents a fluoroalkyl group.

3. The magnetic carrier according to claim 1, wherein the resin B contains a third partial structure represented by the formula (3) at 5.0% by mass or more and 80% by mass or less.

4. The magnetic carrier according to claim 1, wherein the resin B has a partial structure of a macromonomer side chain represented by formula (5)

Formula (5)

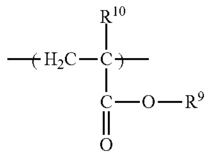

wherein in formula (5), $R^9$ represents a group composed of a polymer of one or more monomers selected from the group consisting of methyl acrylate, methyl methacrylate, butyl acrylate, butyl methacrylate, 2-ethylhexyl acrylate, 2-ethylhexyl methacrylate, styrene, and acrylonitrile, and $R^{10}$ represents a hydrogen or methyl group.

5. The magnetic carrier according to claim 1, wherein an average layer thickness of the coating resin layer formed on the magnetic carrier core is 50 nm or more and 3000 nm or less.

6. The magnetic carrier according to claim 1, wherein the magnetic carrier core is selected from the group consisting of porous magnetic core particles, porous magnetic core particles with pores filled with resin, and magnetic material-dispersed resin particles.

7. A two-component developer comprising:

a magnetic carrier; and toner, wherein the magnetic carrier includes a magnetic carrier core and a coating resin layer coating a surface of the magnetic carrier core, the coating resin layer contains resin A and resin B, a content of the resin A is 1% by mass or more and 50% by mass or less based on mass of resin components contained in the coating resin layer, a content of the resin B is 50% by mass or more and 99% by mass or less based on mass of resin components contained in the coating resin layer, the resin A has a first partial structure represented by formula (1) and a second partial structure represented by formula (2), the resin B has a third partial structure represented by formula (3) and a fourth partial structure represented by formula (4), when a mass of the resin A is represented by X, a total mass of the first partial structure in the resin A is represented by Ma, and a total mass of the second partial structure in the resin A is represented by Mb, X, Ma and Mb satisfy $$0.50 \leq (Ma+Mb)/X \leq 1.00$$

$$0.10 \leq Ma/Mb \leq 30.0, \text{ and}$$

when an SP value of the first partial structure of the resin A is represented by SPa1, and an SP value of the third partial structure of the resin B is represented by SPb3, SPa1 and SPb3 satisfy $$0 \leq |SPa1 - SPb3| \leq 10.0,$$

Formula (1)

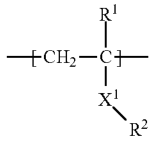

wherein in formula (1), $R^1$ represents a hydrogen or methyl group, $X^1$ represents —COO— or —O—, $R^2$ represents an alkyl group having 1 to 20 carbon atoms, the alkyl group is a halogen-substituted alkyl group in which at least a part of hydrogen atoms is substituted with a fluorine atom, and a part of remaining hydrogen atoms may be substituted with a halogen atom other than a fluorine atom, and based on a total number of hydrogen atoms, fluorine atoms, and halogen atoms other than fluorine atoms contained in the halogen-substituted alkyl group, a proportion of the fluorine atoms is 5.0 atom % or more, and a proportion of the halogen atoms other than fluorine atoms is 40.0 atom % or less, Formula (2)

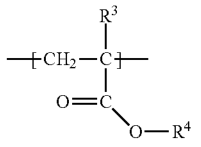

$R^3$ represents a hydrogen or methyl group, $R^4$ represents a hydrocarbon group having 1 to 12 carbon atoms, Formula (3)

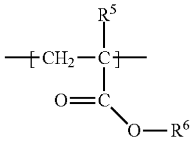

represents a hydrogen or methyl group, $R^6$ represents a hydrocarbon group having 3 to 10 carbon atoms containing an alicyclic structure, Formula (4)

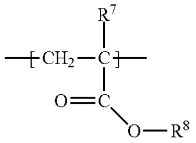

$R^7$ represents a hydrogen or methyl group, and $R^8$ represents a chain hydrocarbon group having 1 to 12 carbon atoms, and when an average value of a total number of the first partial structure and the second partial structure in molecular chains constituting the resin A is represented by m, the m satisfies the following formula $$50 \leq m \leq 250.$$

* * * * *